US012738987B2

(12) United States Patent
Bar-Or Tillinger et al.

(10) Patent No.: US 12,738,987 B2
(45) Date of Patent: Sep. 15, 2026

(54) UE FEEDBACK FOR LAYER REDUCTION

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Tal Oved, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/508,038

(22) Filed: Nov. 13, 2023

(65) Prior Publication Data

US 2025/0158668 A1 May 15, 2025

(51) Int. Cl.

*H04B 7/0417* (2017.01)
*H04B 7/0452* (2017.01)
*H04B 7/0456* (2017.01)
*H04B 7/06* (2006.01)

(52) U.S. Cl.

CPC ......... *H04B 7/0417* (2013.01); *H04B 7/0452* (2013.01); *H04B 7/0486* (2013.01); *H04B 7/063* (2013.01)

(58) Field of Classification Search

None

See application file for complete search history.

(56) References Cited

U.S. PATENT DOCUMENTS

2018/0026688 A1 1/2018 Weng et al.
2022/0360370 A1* 11/2022 Kutz .................... H04L 1/0057
2022/0368387 A1 11/2022 Kutz et al.
2023/0112772 A1 4/2023 Kutz et al.

FOREIGN PATENT DOCUMENTS

WO WO-2019144929 A1 * 8/2019 ........... H04B 7/0658
WO 2022228663 A1 11/2022
WO 2023076047 A1 5/2023

OTHER PUBLICATIONS

International Search Report and Written Opinion—PCT/US2024/046132—ISA/EPO—Jan. 7, 2025—24 pages.

* cited by examiner

*Primary Examiner* — Kouroush Mohebbi
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE obtains the channel information including at least one of a set of mutual information for each layer of a first number of layers associated with a channel between the UE and a network entity, or rank reduction information for a rank reduction of the channel. The UE further transmit the channel information to the network entity for the identification of a precoding scheme for communication between the UE and the network entity; and communicates with the network entity, based on the channel information and the precoding scheme.

28 Claims, 12 Drawing Sheets

100
Service Management and Orchestration (SMO) Framework
105
Non-Real Time RAN Intelligent Controller (RIC)
115
Near-Real Time RAN Intelligent Controller (RIC)
125
O-eNB
111
O-Cloud
190
O1
O2
A1
E2
CU
110
F1
DU
130
RU
140
UE
104
Midhaul link
Fronthaul link
Access link
Backhaul Link
SPS
170
182
184
150
154
158
Core Network
120
AMF
161
SMF
162
UPF
163
UDM
164
GMLC
165
LMF
166
Set of Location Servers
168
Rank Reduction Component
199
198
BS 102

One Frame (TDD)
10 ms
200
subframe
RB
slot
D D D D D D D D D D D D F U
subcarrier
OFDM symbol
slot
DMRS R
CSI-RS
230
PDCCH CORESET
SSS
PSS
PDSCH
PBCH
REG 12 REs
1 CCE = 6 REGs
SS/PBCH Block
BWP
BWP
20 RBs
channel bandwidth RBs
One Frame (TDD)
10 ms
250
subframe
RB
slot
U U U U U U U U U U U U U U
subcarrier
SRS Comb 0
SRS Comb 1
OFDM symbol
SRS
slot
DMRS R
280
PUCCH
PUSCH

UE FEEDBACK FOR LAYER REDUCTION

TECHNICAL FIELD

The present disclosure relates generally to communication systems, and more particularly, to user equipment (UE) feedback for layer reduction in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to obtain channel information including at least one of: a set of mutual information for each layer of a first number of layers associated with a channel between the UE and a network entity, or rank reduction information for a rank reduction of the channel. The at least one processor, individually or in any combination, may be further configured to transmit, to the network entity, the channel information for an identification of a precoding scheme for communication between the UE and the network entity; and communicate with the network entity based on the channel information and the precoding scheme.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to receive, from a UE, channel information including at least one of: a set of mutual information for each layer of a first number of layers associated with a channel between the UE and the network entity, or rank reduction information for a rank reduction of the channel. The at least one processor, individually or in any combination, may be further configured to identify, based on the channel information, a precoding scheme for communication between the UE and the network entity; and communicate, based on the channel information and the precoding scheme, with the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
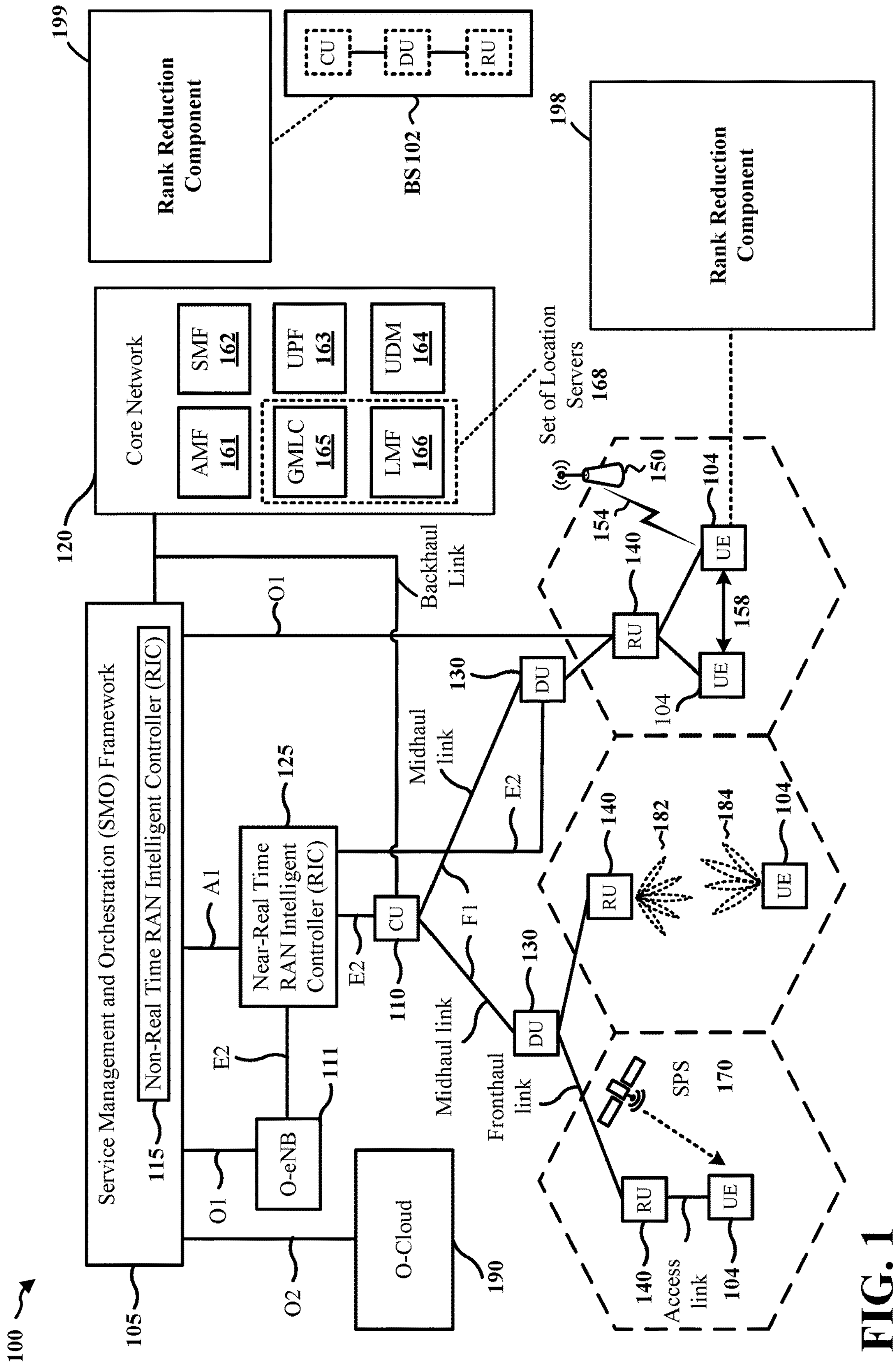
FIG. 1 is a diagram illustrating an example of a wireless communication system and an access network.

Due to the dynamic allocation of data streams by a network scheduler (e.g., gNB scheduler), the number of data streams, or rank, that are allocated to user equipment (UE) may change over time due to factors such as changes in the rank of the channel of the UE that determine the maximum amount of data streams the UE may support or the network scheduler's considerations regarding the status of other UEs in a multi-user multiple-input multiple-output (MU-MIMO) environment. Traditional methods to monitor channel conditions, such as those based on channel state information-reference signal (CSI-RS) or sounding reference signal (SRS), come with considerable overheads on channel resources and induce latency. Example aspects provide methods and apparatus for rank reduction that allow the UE to provide feedback information about the rank and the precoding. In some examples, the feedback information may be provided without incurring additional resource burdens or latency, especially in scenarios where multiple incremental redundancy scheme (MIRS) is utilized.

Various aspects relate generally to wireless communication. Some aspects more specifically relate to UE feedback for layer reduction in wireless communication. In some examples, a UE may obtain channel information including at least one of a set of mutual information for each layer of a first number of layers associated with a channel between the UE and a network entity, or rank reduction information for rank reduction of the channel. The UE may further transmit, to the network entity, the channel information for an identification of a precoding scheme for communication between the UE and the network entity; and communicate with the network entity based on the channel information and the precoding scheme. In some aspects, the UE may provide, for the network entity, a feedback transmission for adjusting a coding rate for the communication between the UE and the network entity, and the channel information may be transmitted via the feedback transmission. In some aspects, the feedback transmission for adjusting the coding rate may be associated with a multiple incremental redundancy scheme (MIRS).

Particular aspects of the subject matter described in this disclosure can be implemented to realize one or more of the following potential advantages. In some examples, by providing channel information related to the channel condition to the network for the rank reduction, the described techniques can be used to enable better resource allocation and improved data transmission. In some examples, by providing the channel information that includes measured mutual information (MI) per layer of a plurality of layers, the described techniques allow the network to evaluate the reception quality on a per-layer basis, ensuring the best layer per frequency is selected, thereby enhancing the efficiency of data transmission. In some examples, by providing channel information that includes a rank reduction matrix to the network, the described techniques ensure the most suitable precoding matrix is used under the current channel conditions, thereby ensuring the quality of data transmission.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a rank reduction component 198. The rank reduction component 198 may be configured to obtain channel information including at least one of: a set of mutual information for each layer of a first number of layers associated with a channel between the UE and a network entity, or rank reduction information for a rank reduction of the channel; transmit, to the network entity, the channel information for an identification of a precoding scheme for communication between the UE and the network entity; and communicate, based on the channel information and the precoding scheme, with the network entity. In certain aspects, the base station 102 may include a rank reduction component 199. The rank reduction component 199 may be configured to receive, from a UE, channel information including at least one of: a set of mutual information for each layer of a first number of layers associated with a channel between the UE and the network entity, or rank reduction information for a rank reduction of the channel; identify, based on the channel information, a precoding scheme for communication between the UE and the network entity; and communicate, based on the channel information and the precoding scheme, with the UE. Although the following description may be focused on 5G NR, the concepts described herein may be applicable to other similar areas, such as LTE, LTE-A, CDMA, GSM, and other wireless technologies.

Figure 2B:
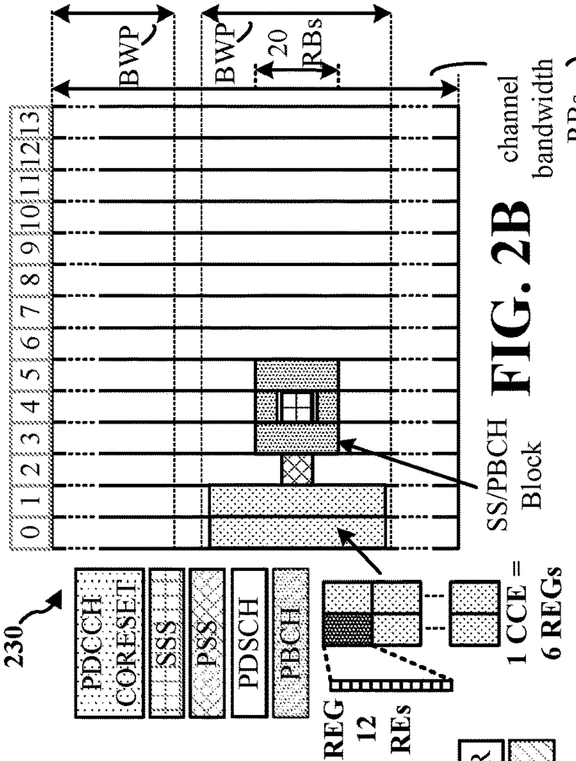
FIG. 2B is a diagram illustrating an example of downlink (DL) channels within a subframe, in accordance with various aspects of the present disclosure.
Figure 2A:
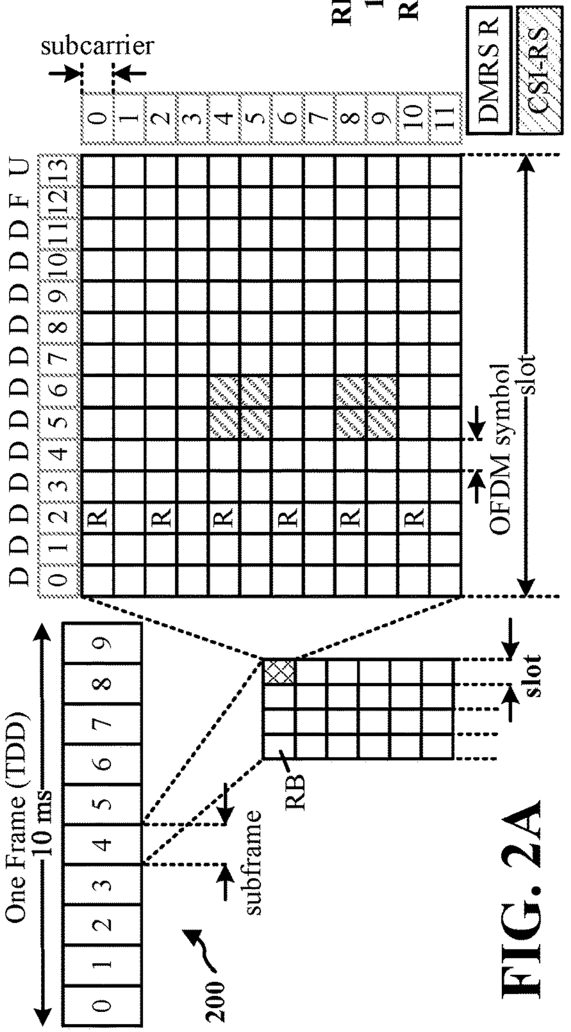
FIG. 2A is a diagram illustrating an example of a first frame, in accordance with various aspects of the present disclosure.
Figure 2D:
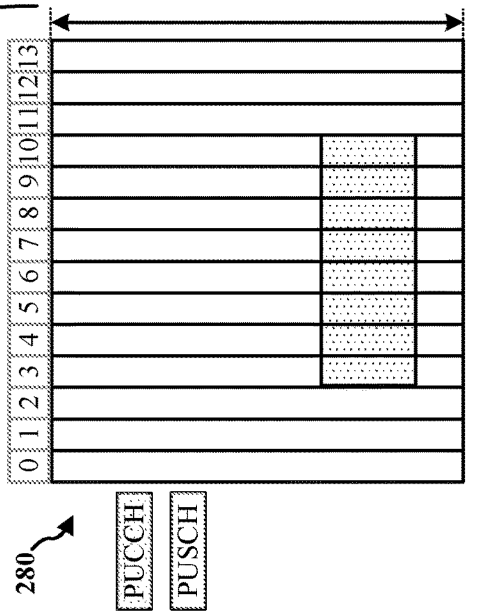
FIG. 2D is a diagram illustrating an example of uplink (UL) channels within a subframe, in accordance with various aspects of the present disclosure.
Figure 2C:
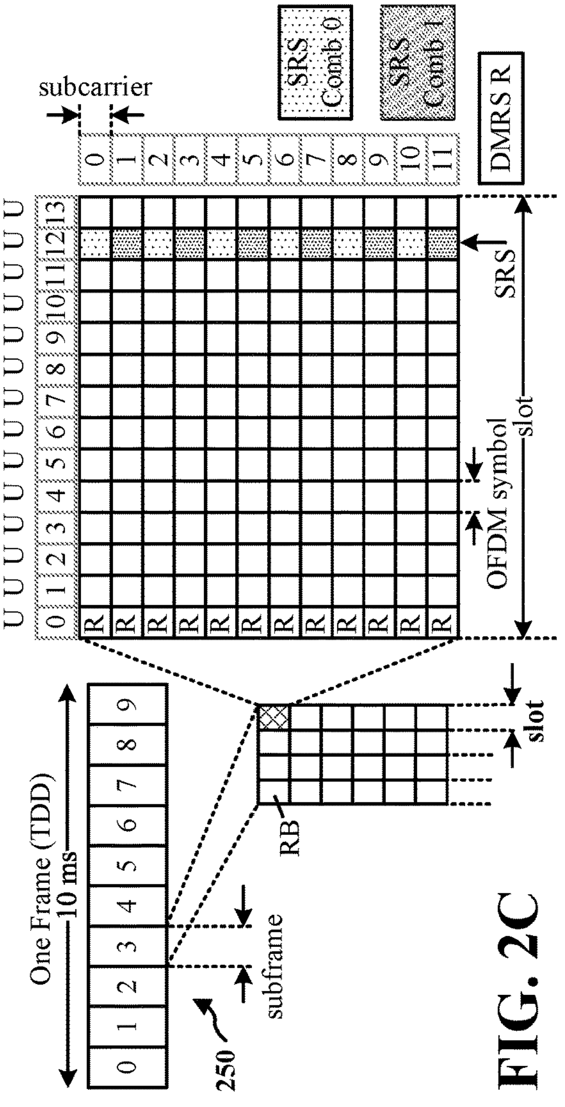
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
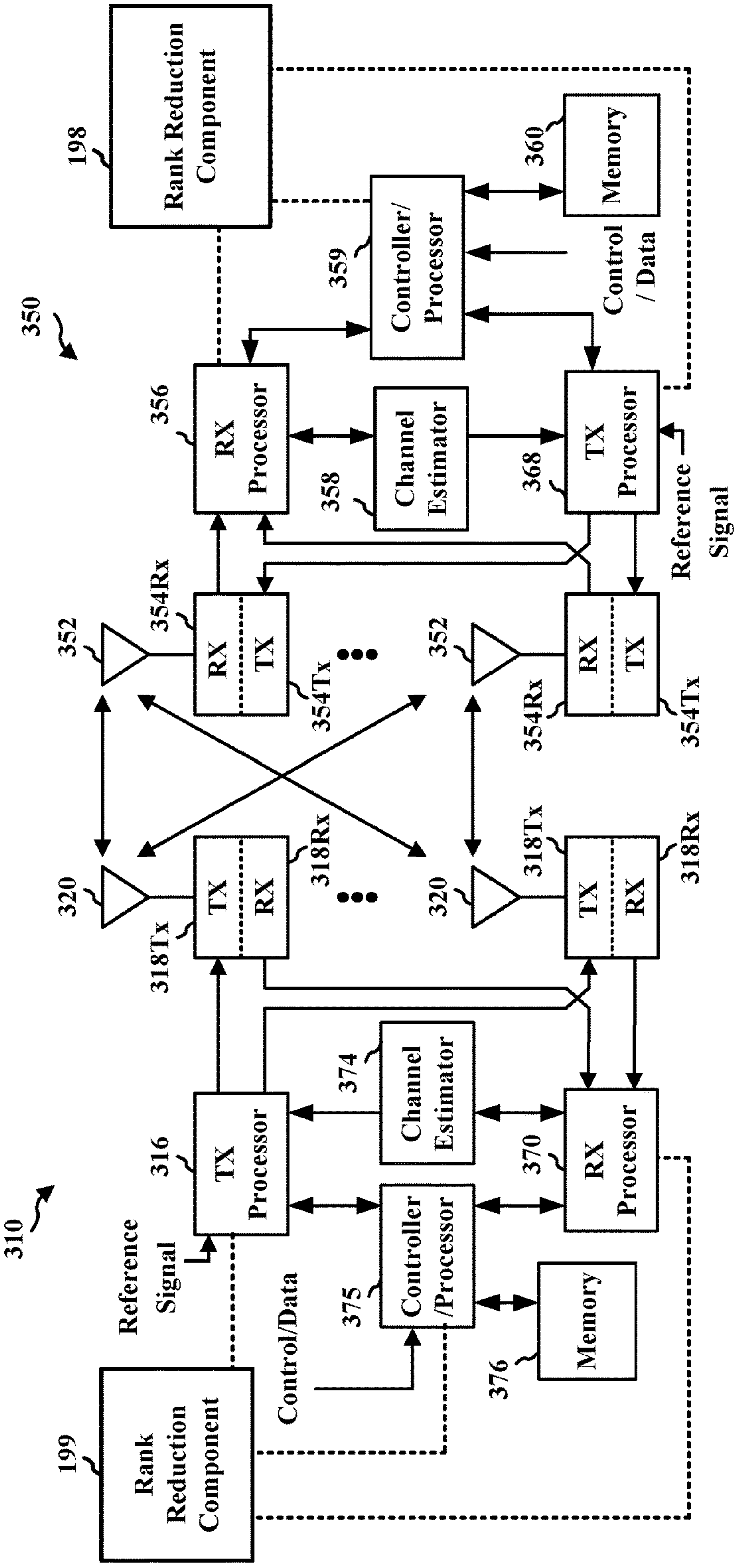
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the rank reduction component 198 of FIG. 1.

At least one of the TX processor 316, the RX processor 370, and the controller/processor 375 may be configured to perform aspects in connection with the rank reduction component 199 of FIG. 1.

Example aspects provide methods and apparatus related to the concept of the multiple incremental redundancy scheme (MIRS) for wireless communication technologies (e.g., 6G technologies), which is a rate adaptation scheme based on multiple re-transmission (ReTx). The example aspects propose techniques for UE feedback for the MIRS approach for rank reduction. The UE will provide feedback on the rank and precoding based on the demodulation reference signal (DMRS) and physical downlink shared channel (PDSCH). In a first proposal, the UE feeds back the mutual information (MI) per layer over time/frequency granularity that allows the network to estimate the expected degradation in rank reduction. This proposal includes some signaling options. In a second proposal, the UE calculates and reports a precoding matrix that is applied on top of the current precoder used by the network in order to reduce the number of layers to a desired rank. This proposal also includes some signaling options.

Due to the dynamic nature of the network scheduler (e.g., gNB scheduler), the number of data streams, or rank, that are allocated to a UE may change rapidly over time. The changes on the number of data streams may be due to, for example, the changes in the rank of the channel of the UE that determine the maximum amount of data streams the UE may support. Additionally, the network scheduler might adjust the data streams allocated to the UE based on the status of other UEs in scenarios involving multi-user multiple-input multiple-output (MU-MIMO), where multiple devices share data streams.

To monitor the channel conditions, the network (e.g., gNB) may use one of two available mechanisms. The first mechanism is based on channel state information-reference signal (CSI-RS). In this mechanism, the network (e.g., gNB) may transmit a reference signal from multiple ports, and the UE may measure this signal and then send back feedback of the quality of the measured channel. The second mechanism is based on sounding reference signal (SRS). In the second mechanism, the UE may send a reference signal for the network (e.g., gNB) to measure the channel quality, in the case the reciprocity can be assumed. However, both these methods result in significant overhands of both channel resources and added latency.

Multiple incremental redundancy scheme (MIRS) is a rate adaptation scheme based on multiple incremental redundancy hybrid automatic repeat request (IR-HARQ) re-transmissions, which provides substantial advantages over the CSI-RS based rate adaptation.

The current CSI-RS-based channel capacity tracking scheme cannot adapt to the instantaneous optimal modulation and coding scheme (MCS). This limitation arises from the imperfect nature of CSI-RS estimation, and that channel states are sampled at a discrete time (e.g., CSI-RS slots), while even in low velocities, the optimal MCS (and the coding rate) may change significantly between these CSI-RS slots. As a result, the used MCS is set on the first transmission and cannot be dynamically adjusted after the first transmission.

The MIRS closes the gap to optimal MCS selection and achieves communication at the capacity coding rate, regardless of the mobility. The MIRS starts with transmitting at an overestimated MCS, ensuring that throughput is not lost due to an underestimated rate. Then, the MIRS relies on extensive usage of small-sized re-transmission (e.g., IR-HARQ)

for fine, dynamic adaptation of the coding rate based on the receiver's feedback. For example, each time the receiver sends a Negative Acknowledgment (NACK) or, alternatively, does not send an Acknowledgment (ACK), a small number of additional redundancy bits may be transmitted. As used herein, the coding rate (or information rate) of a forward error correction code refers to the proportion of the data stream that is useful (non-redundant). For example, if the coding rate is k/n for every k bits of useful information, the coder generates a total of n bits of data, of which n-k bits are redundant. The coding rate may reflect the data throughput (the higher the coding rate, the higher the throughput) in wireless communication.

Example aspects presented herein provide two approaches for rank reduction, in which the UE will provide feedback to the network (e.g., gNB) about the rank and the precoding based on demodulation reference signal (DMRS) and PDSCH. In some examples, the UE may provide the feedback when MIRS is in operation, and the feedback may not consume any additional channel resources and will allow much smaller latency for rank reduction. As used herein, the "rank reduction" refers to the reduction of the number of streams (or layers) that are allocated to the UE. For example, the UE may provide information about the layers or precoding so that the network (e.g., a gNB) may evaluate the channel condition (including the reduction in its rank) and appropriately reduce the number of layers (e.g., by "forming" a combined layer).

In some aspects, the UE may provide feedback of the channel information to the network (e.g., gNB). The channel information may include information of the channel related to the rank reduction (layer reduction). In some examples, the channel information may include a set of measured mutual information (MI) for each layer of a plurality of layers (e.g., the first number of layers) associated with the channel between the UE and the network (e.g., gNB). As used herein, a "layer" may refer to a data stream between the UE and the network. For example, a data stream may be transmitted from all (or at least several) antennas of a transmitter and received the antennas of a receiver. Different data streams may be differentiated by their precoding, which is a part of the method to map a data stream to multiple transmit antennas. Each mutual information of the set of mutual information may be based on a set of log-likelihood ratio (LLR) values associated with each layer of the first number of layers. For example, the mutual information (I(x;y)) for one layer may be calculated by the following equations:

$$LLR_i = \ln\left(\frac{p(0 \mid y_i)}{p(1 \mid y_i)}\right) \tag{1}$$

$$p(1 \mid y_i) = \frac{1}{1 + e^{LLR_i}};\ p(0 \mid y_i) = 1 - p(1 \mid y_i)$$

$$I(x; y) = \sum_y \sum_x p(x, y)\log_2\left(\frac{p(x, y)}{p(x)p(y)}\right) = \sum_y \sum_x p(y)p(x \mid y)\log_2\left(\frac{p(x \mid y)p(y)}{p(x)p(y)}\right) = \sum_y p(y) \sum_x p(x \mid y)\log_2(2 \cdot p(x \mid y)) = \frac{1}{N}\sum_{i=0}^{N-1}(p(0 \mid y_i)\cdot\log_2(2 \cdot p(0 \mid y_i)) + p(1 \mid y_i)\cdot\log_2(2 \cdot p(1 \mid y_i)))$$

where x represents the transmitted signal, y represents the received signal, p(·) represents the probability distribution function. p(x, y) is the joint probability distribution function of x and y, p(x) and p(y) are the marginal probability distribution function of x and y, respectively. p(x|y) is the conditional probability distribution function of x given y, and p(y|x) is the conditional probability distribution function of y given x. The index i represents the $i^{th}$ LLR (or the set of LLRs to be averaged) in the same layer.

In Equation (1), the summation and averaging may be performed for all LLRs per resource element (RE), and all REs within the frequency or time range the mutual information is calculated on. In some examples, the mutual information may be obtained via a low complexity operation, such as via a look-up table (LUT). For example, an LUT may store various LLR values and corresponding mutual information for each LLR value, and the mutual information for a given LLR may be obtained through an LUT operation.

The measured mutual information allows the network (e.g., gNB) to evaluate the reception quality for each layer across the frequency range to enhance its ability to estimate the expected degradation in performance from rank reduction. Additionally, since the report may be defined based on a set of resources in the frequency domain, the network (e.g., gNB), in the cases of rank reduction, may formulate a "combined" layer by alternating the precoding matrices over the frequency ranges, such that the optimal layer is selected for each frequency.

Figure 4:
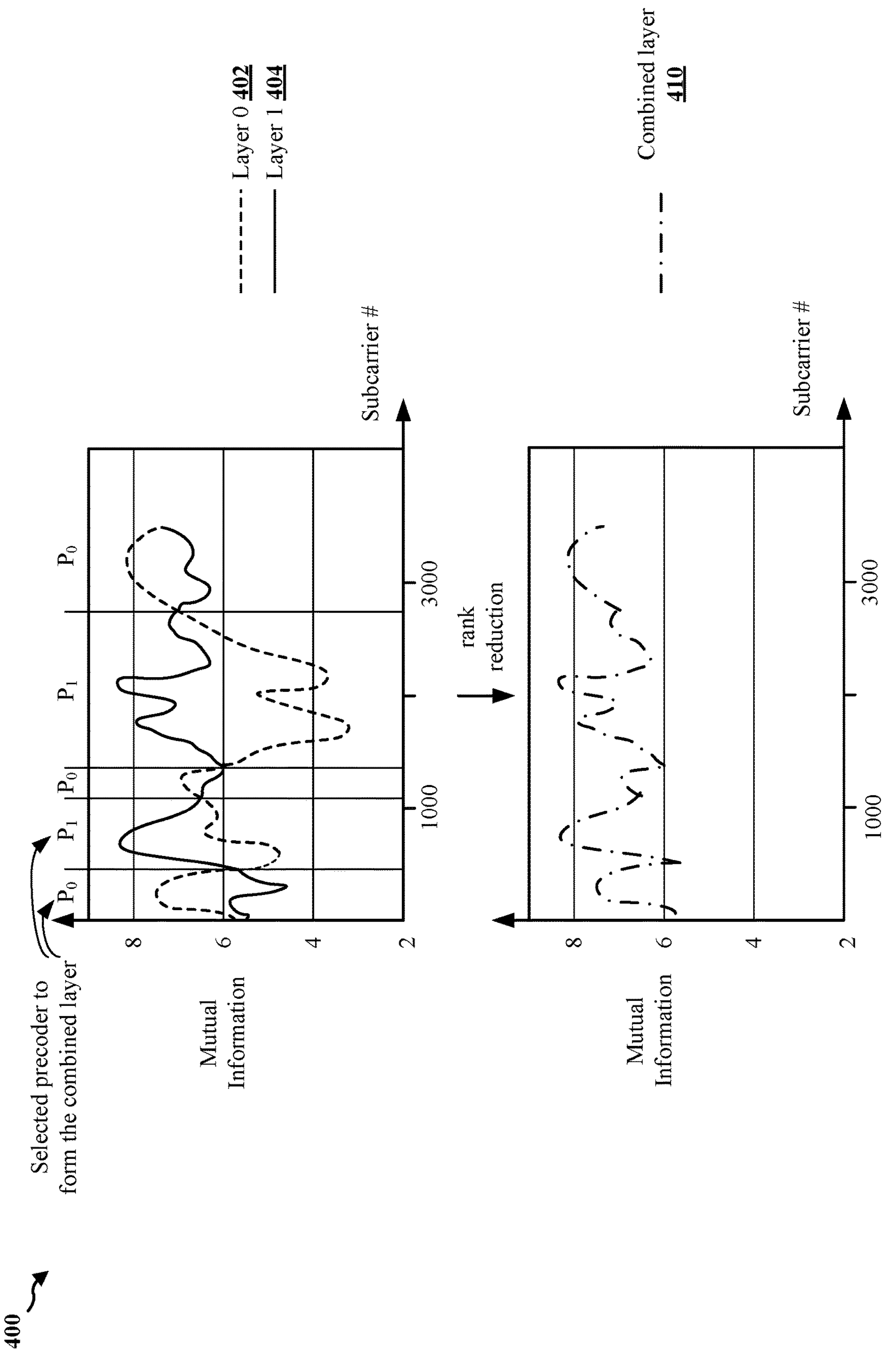
FIG. 4 is a diagram illustrating an example of a combined layer based on the mutual information on two layers in accordance with various aspects of the present disclosure.

FIG. 4 is a diagram 400 illustrating an example of a combined layer based on the mutual information on two layers. FIG. 4 shows data be transmitted via two layers (e.g., layer 0 402 and layer 1 404) between the UE and the network. The UE may compute the mutual information for each layer of the two layers (layer 0 402 and layer 1 404). Based on the MI, the network may identify a combined layer 410 for the data transmission, and the precoder (e.g., the precoding matrix) for the combined layer may be obtained by alternating the precoder (e.g., the precoding matrix) for each of these two layers (e.g., by alternating the precoder $P_0$ for layer 0 402 and the precoder $P_1$ for layer 1 404).

In some aspects, to support the feedback of the set of mutual information from the UE to the network (e.g., gNB), the network may define the report parameters for the UE. The report parameters may include, for example, the frequency domain resolution for the MI, the time domain resolution for the MI, and the report periodicity for the transmission of the MI. In some examples, the transmission of the mutual information may not be periodic. In that case, the report parameters may further include an indicator indicating the a-periodical transmission of the MI.

In some aspects, the transmission of the mutual information may be carried via various signaling mechanisms, such as uplink control information (UCI), a medium access control (MAC)-control element (MAC-CE), or a radio resource control (RRC) message.

In some aspects, the channel information the UE provide to the network (e.g., gNB) may include rank reduction information for the rank reduction of the channel between the UE and the network. In some examples, the rank reduction information may include a rank reduction matrix the UE calculates. The rank reduction matrix may be applied on top of the current precoding matrix used by the network (e.g., gNB) in order to reduce the number of layers to a desired rank.

Figure 5:
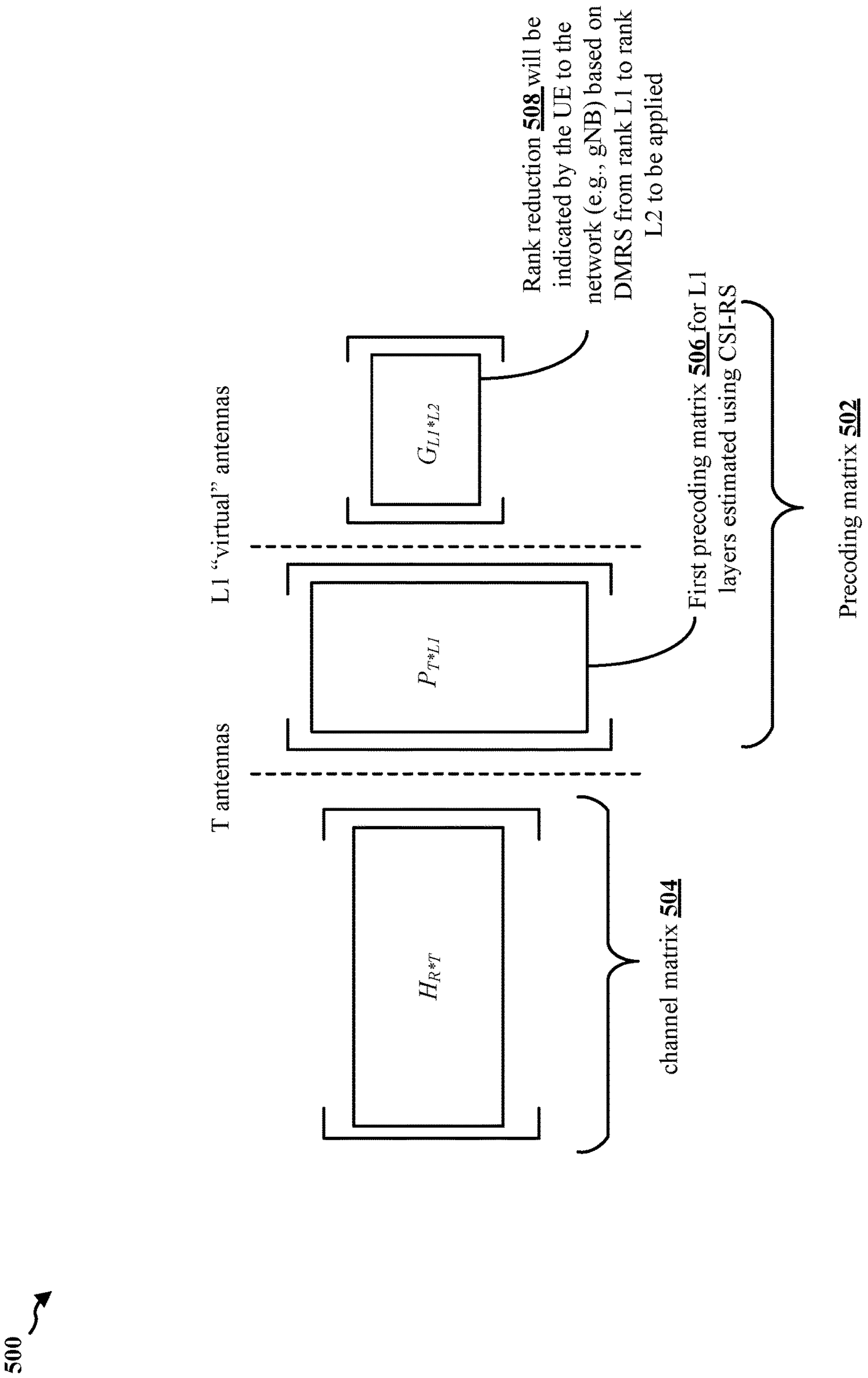
FIG. 5 is a diagram illustrating an example of the precoding matrix structure in accordance with various aspects of the present disclosure.

FIG. 5 is a diagram 500 illustrating an example of the precoding matrix structure in accordance with various aspects of the present disclosure. In FIG. 5, the overall precoding matrix 502 may include two components: a first precoding matrix $P_{T*L1}$ 506, where $L_1$ is the number of "virtual antennas," which is a number of effective antennas in the rank deduction that may be used to represent the characteristics of the MIMO system with a larger number of physical antennas, and the rank reduction matrix $G_{L1*L2}$ 508. The rank reduction matrix 508 may be indicated by the UE to the network (e.g., gNB) based on the DMRS from rank L1 to rank L2 to be applied. In FIG. 5, the first precoding matrix $P_{T*L1}$ 506 represents a rank reduction process (from T to L1) related to the "virtual antennas." This rank reduction process may be performed using a CSI-RS, for example, and may be performed in advance. FIG. 5 also shows a channel matrix $H_{R*T}$ 504, where R and T are the number of receiving antennas and transmitting antennas, respectively.

In some examples, the calculation the rank reduction matrix may be based on a precoded DMRS. For example, the UE may receive at least one DMRS and determine the rank reduction matrix based on the at least one DMRS.

In some aspects, to support the feedback of the rank reduction matrix from the UE to the network (e.g., gNB), the network may transmit a rank reduction configuration for the UE. The rank reduction configuration may include the parameters for transmitting the rank reduction matrix. These parameters may include, for example, the desired number of layers after the rank deduction, one or more criteria for the rank deduction. For example, the criteria may be related to the capacity of the channel between the UE and the network (e.g., gNB) or the signal-to-noise ratio (SNR) of the channel. The parameters may further include the frequency domain resolution of the precoder, an indication of a codebook for the available precoders, and the restrictions for the precoder. For example, the restrictions for the precoder may include the maximal power per antenna. In some examples, the antenna may be a virtual antenna. The parameters may further include the report periodicity for the transmission of the rank reduction matrix. In some examples, the transmission of the precoding matrix may not be periodic. In that case, the parameters may include an indicator indicating the a-periodical transmission of the rank reduction matrix.

In some aspects, the transmission of the rank reduction matrix may be carried via various signaling mechanisms, such as UCI, a MAC-CE, or an RRC message.

Figure 6:
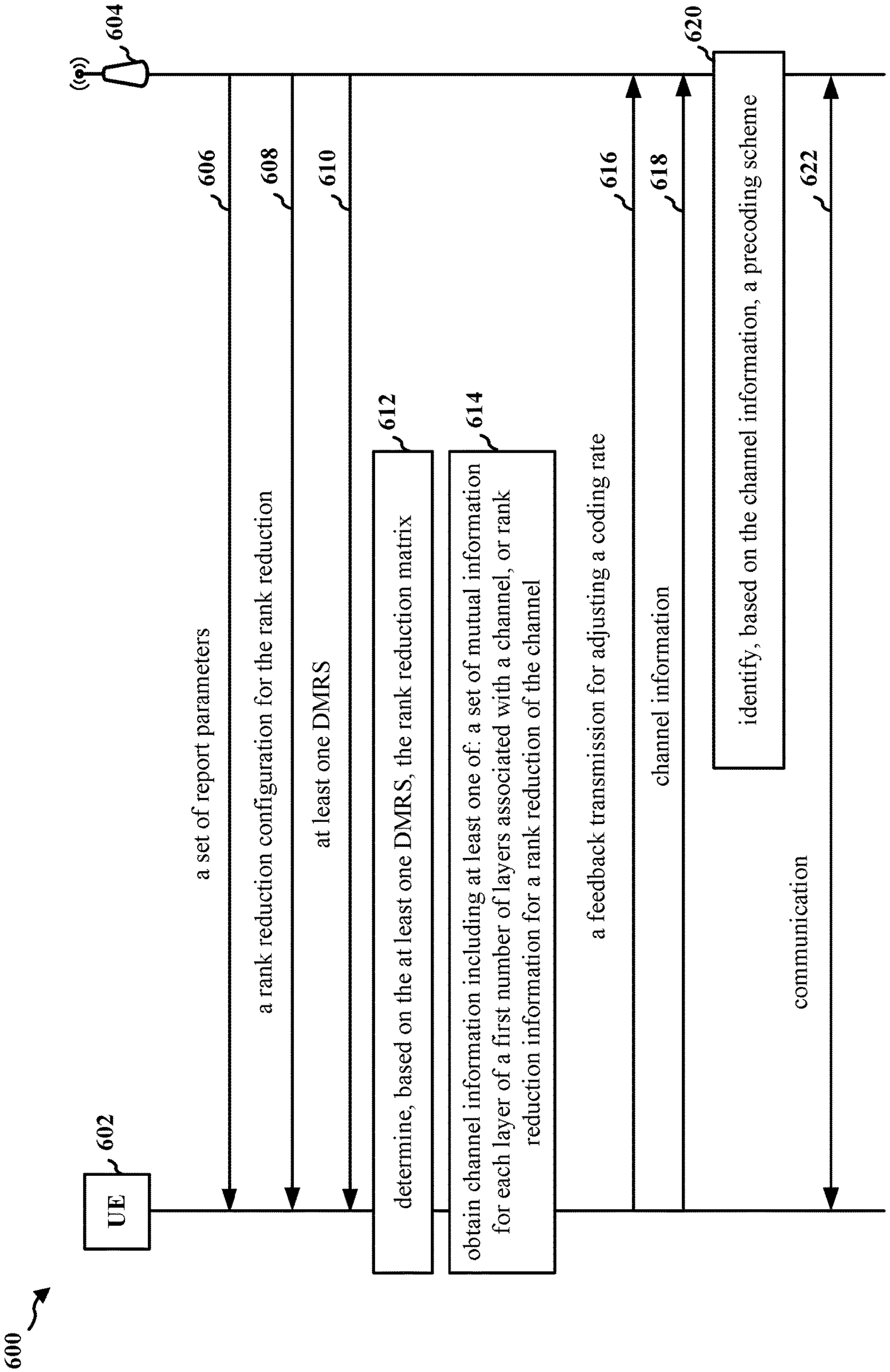
FIG. 6 is a call flow diagram illustrating a method of wireless communication in accordance with various aspects of the present disclosure.

FIG. 6 is a call flow diagram 600 illustrating a method of wireless communication in accordance with various aspects of this present disclosure. Various aspects are described in connection with a UE 602 and a base station 604. The aspects may be performed by the UE 602 or the base station 604 in aggregation and/or by one or more components of a base station 604 (e.g., a CU 110, a DU 130, and/or an RU 140).

As shown in FIG. 6, at 606, the UE 602 may receive from the base station 604 a set of report parameters for transmitting the channel information of the channel between the UE 602 and base station 604. In some examples, the channel information may include a set of mutual information for each layer of a plurality of layers associated with the channel. For example, the report parameters may include, for example, the frequency domain resolution for the MI, the time domain resolution for the MI, the report periodicity for the transmission of the MI, or, in the scenarios where the mutual information transmission is not periodic, an indicator indicating the a-periodical transmission of the MI.

At 608, the UE 602 may receive from base station 604 a rank reduction configuration for the rank reduction of the channel between the UE 602 and base station 604. The rank reduction configuration may include, for example, the number of layers after the rank reduction, one or more criteria for the rank reduction (e.g., the capacity or the SNR of the channel), the frequency domain resolution of a precoder, an indication of the codebook including a set of available precoders, the restriction condition for the precoder (e.g., the maximum power per antenna or virtual antenna), the report periodicity for the transmission of the rank reduction matrix, or, in the scenarios where the transmission is not periodic, an indicator indicating the a-periodical transmission of the rank reduction matrix.

At 610, the UE 602 may receive at least one DMRS from the base station 604.

At 612, the UE 602 may determine the rank reduction matrix based on the DMRS.

At 614, the UE 602 may obtain channel information. In some examples, the channel information may include a set of mutual information for each layer of the plurality of layers (e.g., a first number layers) associated with the channel between the UE 602 and base station 604. In some examples, the channel information may include the rank reduction information for the rank reduction of the channel.

At 616, the base station 604 may transmit a feedback transmission for adjusting the coding rate for the communication between the UE 602 and base station 604. In some examples, the feedback transmission may be associated with the multiple incremental redundancy scheme (MIRS).

At 618, the base station 604 may provide the channel information (obtained at 614) to base station 604. In some examples, the channel information may be transmitted to base station 604 via the feedback transmission (at 616). In some examples, the channel information may be transmitted as a separated transmission (i.e., independent of the feedback transmission at 616) to base station 604.

At 620, the base station 604 may identify a precoding scheme for communication between the UE 602 and base station 604 based on the channel information. The precoding scheme may include information about the precoding process applied to the communication, such as the rank (or layer) reduction process used, the precoder employed after the rank reduction, and the resulting number of layers after the rank reduction. In some examples, the precoding scheme may include one or more sets of combined precoders based on original precoders for each layer of the first number of layers over a set of frequency ranges. In some examples, the precoding scheme may further include a second number of combined layers based on the mutual information for each layer of the first number of layers. The second number may be less than the first number, and the second number of combined layers may respectively correspond to the one or more sets of combined precoders.

At 622, the UE 602 and base station 604 may communicate based on the channel information and the precoding scheme.

Figure 7:
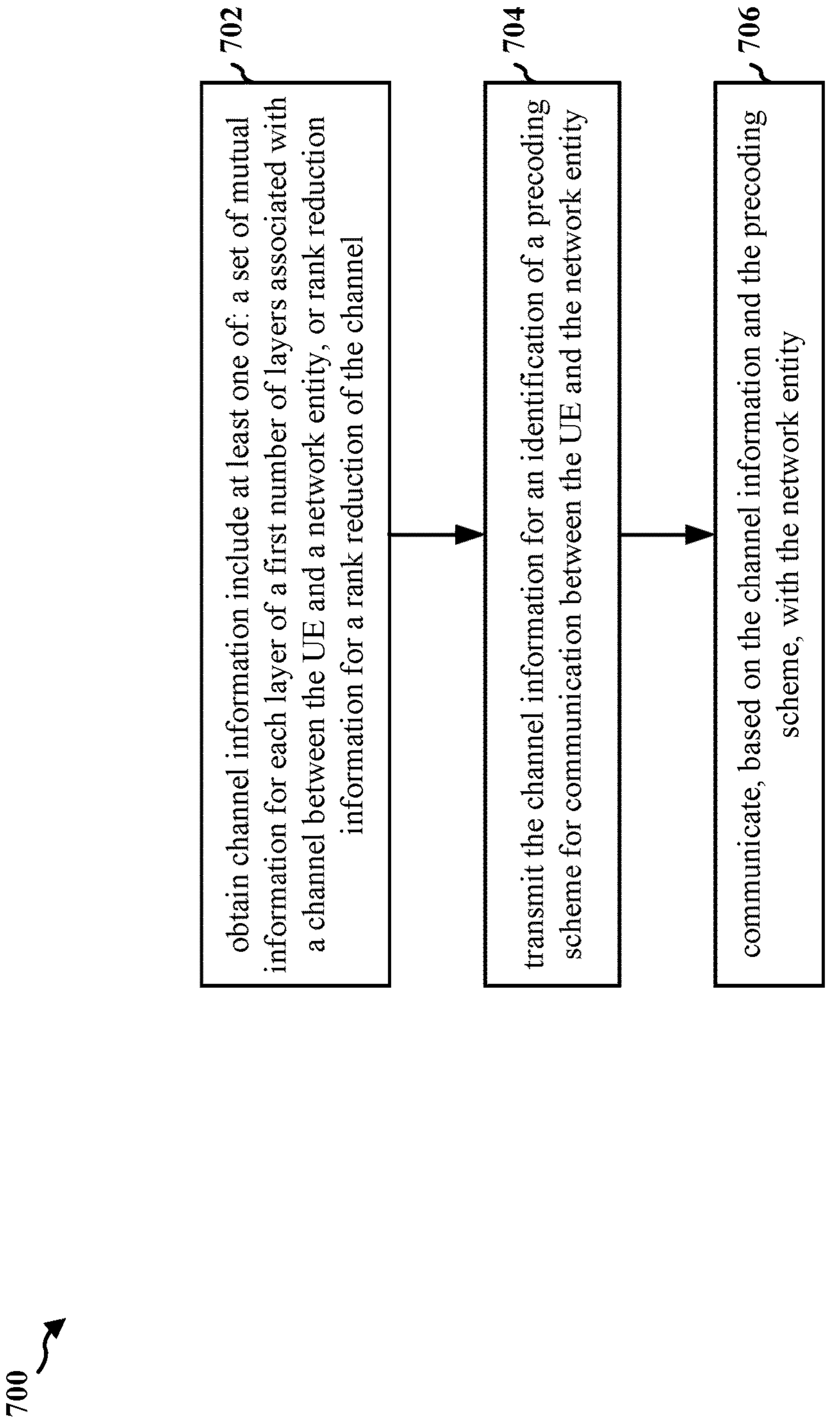
FIG. 7 is a flowchart illustrating methods of wireless communication at a UE in accordance with various aspects of the present disclosure.

FIG. 7 is a flowchart 700 illustrating methods of wireless communication at a UE in accordance with various aspects of the present disclosure. The method may be performed by a UE. The UE may be the UE 104, 350, 602, or the apparatus 1104 in the hardware implementation of FIG. 11. By providing channel information related to the channel condition, including measured mutual information per layer of a plurality of layers or the rank reduction matrix, to the network for the rank reduction, the methods allow the network to evaluate the reception quality on a per-layer basis, ensuring the best layer per frequency is selected and the most suitable precoding matrix is used under the current channel conditions, thereby enhancing the efficiency and quality of data transmission.

As shown in FIG. 7, at 702, the UE may obtain channel information. The channel information may include at least one of: a set of mutual information for each layer of a first number of layers associated with a channel between the UE and a network entity, or rank reduction information for a rank reduction of the channel. The network entity may be a base station, or a component of a base station, in the access network of FIG. 1 or a core network component (e.g., base station 102, 310, 604; or the network entity 1102 in the hardware implementation of FIG. 11). FIG. 4, FIG. 5, and FIG. 6 illustrate various aspects of the steps in connection with flowchart 700. For example, referring to FIG. 6, the UE 602 may, at 614, obtain channel information. The channel information may include at least one of: a set of mutual information for each layer of a first number of layers associated with a channel between the UE 602 and a network entity (base station 604), or rank reduction information for a rank reduction of the channel. In some aspects, 702 may be performed by the rank reduction component 198.

At 704, the UE may transmit, to the network entity, the channel information for an identification of a precoding scheme for communication between the UE and the network entity. For example, referring to FIG. 6, the UE 602 may, at 618, transmit, to the network entity (base station 604), the channel information for an identification of a precoding scheme for communication between the UE 602 and the network entity (base station 604). In some aspects, 702 may be performed by the rank reduction component 198.

At 706, the UE may communicate with the network entity based on the channel information and the precoding scheme. For example, referring to FIG. 6, the UE 602 may, at 622, communicate with the network entity (base station 604) based on the channel information and the precoding scheme. In some aspects, 706 may be performed by the rank reduction component 198.

Figure 8:
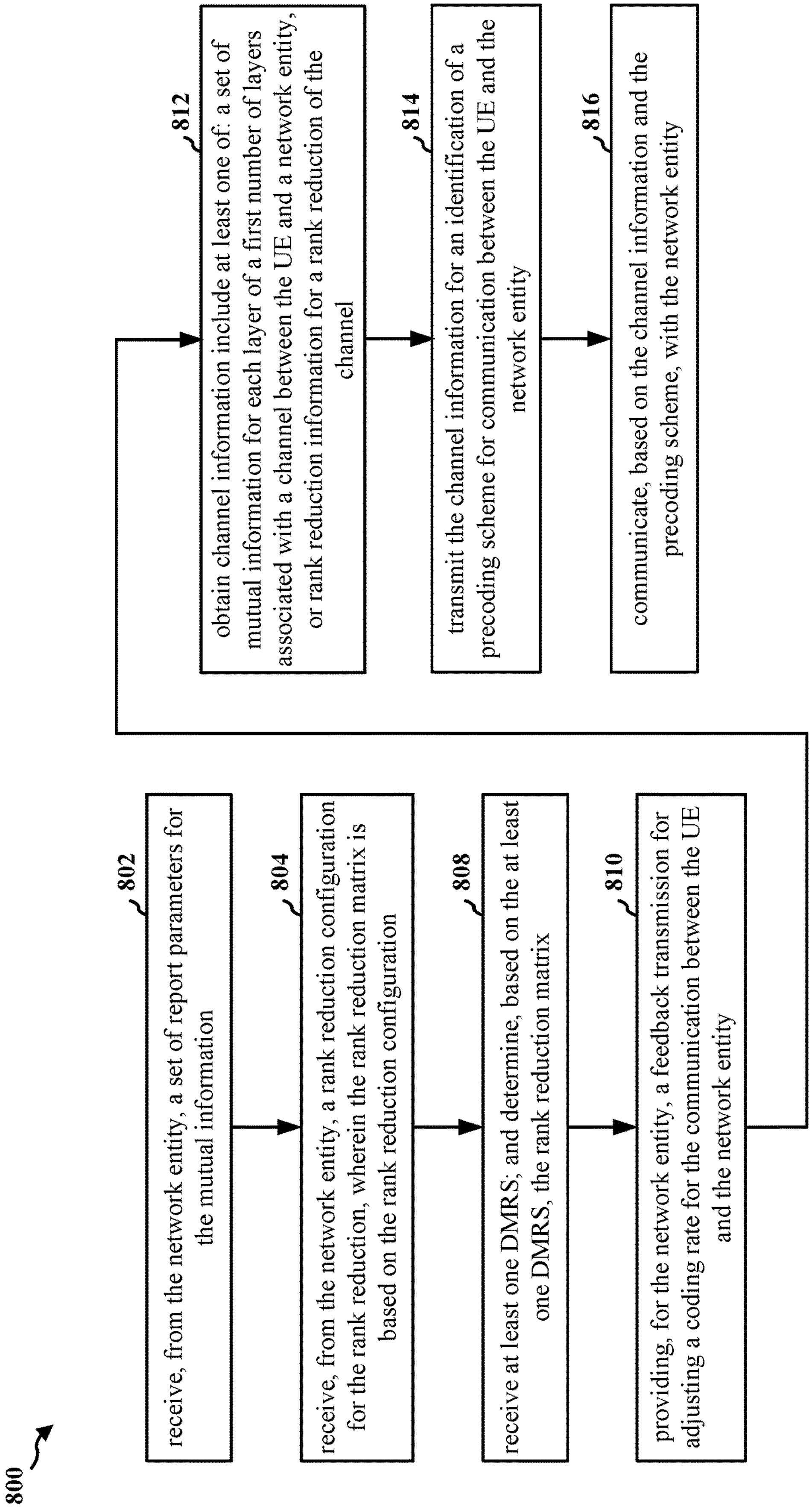
FIG. 8 is a flowchart illustrating methods of wireless communication at a UE in accordance with various aspects of the present disclosure.

FIG. 8 is a flowchart 800 illustrating methods of wireless communication at a UE in accordance with various aspects of the present disclosure. The method may be performed by a UE. The UE may be the UE 104, 350, 602, or the apparatus 1104 in the hardware implementation of FIG. 11. By providing channel information related to the channel condition, including measured mutual information per layer of a plurality of layers or the rank reduction matrix, to the network for the rank reduction, the methods allow the network to evaluate the reception quality on a per-layer basis, ensuring the best layer per frequency is selected and the most suitable precoding matrix is used under the current channel conditions, thereby enhancing the efficiency and quality of data transmission.

As shown in FIG. 8, at 812, the UE may obtain channel information comprising at least one of: a set of mutual information for each layer of a first number of layers associated with a channel between the UE and a network entity, or rank reduction information for a rank reduction of the channel. The network entity may be a base station, or a component of a base station, in the access network of FIG. 1 or a core network component (e.g., base station 102, 310, 604; or the network entity 1102 in the hardware implementation of FIG. 11). FIG. 4, FIG. 5, and FIG. 6 illustrate various aspects of the steps in connection with flowchart 800. For example, referring to FIG. 6, the UE 602 may, at 614, obtain channel information. The channel information may include at least one of: a set of mutual information for each layer of a first number of layers associated with a channel between the UE 602 and a network entity (base station 604), or rank reduction information for a rank reduction of the channel. In some aspects, 812 may be performed by the rank reduction component 198.

At 814, the UE may transmit, to the network entity, the channel information for an identification of a precoding scheme for communication between the UE and the network entity. For example, referring to FIG. 6, the UE 602 may, at 618, transmit, to the network entity (base station 604), the channel information for an identification of a precoding scheme for communication between the UE 602 and the network entity (base station 604). In some aspects, 814 may be performed by the rank reduction component 198.

At 816, the UE may communicate with the network entity based on the channel information and the precoding scheme. For example, referring to FIG. 6, the UE 602 may, at 622, communicate with the network entity (base station 604) based on the channel information and the precoding scheme. In some aspects, 816 may be performed by the rank reduction component 198.

In some aspects, to transmit the channel information (at 814), the UE may transmit the channel information via one of: UCI, a MAC-CE, or an RRC message. For example, referring to FIG. 6, the UE 602 may, at 618, transmit the channel information via one of: UCI, a MAC-CE, or an RRC message.

In some aspects, at 810, the UE may provide, for the network entity, a feedback transmission for adjusting the coding rate for the communication between the UE and the network entity. In some examples, the feedback transmission may be associated with the MIRS. In some examples, to transmit the channel information (at 814), the UE may transmit the channel information via the feedback transmission. For example, referring to FIG. 6, the UE 602 may, at 616, provide, for the network entity (base station 604), a feedback transmission for adjusting the coding rate for the communication between the UE 602 and the network entity (base station 604). In some examples, the feedback transmission (at 616) may be associated with the MIRS. In some examples, to transmit the channel information (at 618), the UE may transmit the channel information via the feedback transmission (at 616). In some aspects, 810 may be performed by the rank reduction component 198.

In some aspects, the channel information (at 812) may include the set of mutual information for each layer of the first number of layers based on at least one of a time-domain granularity or a frequency-domain granularity, and each mutual information of the set of mutual information may be based on a set of log-likelihood ratio (LLR) values associated with each layer of the first number of layers. For example, referring to FIG. 4, the channel information may include the set of mutual information for each layer of the first number of layers (e.g., two sets of mutual information for layer 0 402 and layer 1 404, respectively). The mutual information may be calculated based on a set of LLR values according to Equation (1).

In some aspects, the set of mutual information for each layer of the first number of layers may be based on an average of the mutual information corresponding to the LLR values related to a desired set of frequencies or a desired set of OFDM symbols. For example, referring to FIG. 4, the mutual information for layer 0 402 and layer 1 404 may be based on the average of the mutual information corresponding to the LLR values related to a desired set of frequencies or a desired set of OFDM symbols.

In some aspects, the set of mutual information may be based on a look-up table (LUT). The LUT may include the LLR values and corresponding mutual information. For example, an LUT may include the LLR values and the corresponding mutual information computed based on the LLR values based on Equation (1), for example. The set of mutual information may be obtained based on the LLR values by an LUT operation.

In some aspects, at 802, the UE may receive a set of report parameters for the mutual information from the network entity. The set of report parameters may include one or more of: the frequency domain resolution for the mutual information, the time domain resolution for the mutual information, the report periodicity for the transmission of the mutual information, or an indicator of the a-periodical transmission of the mutual information. For example, referring to FIG. 6, the UE 602 may, at 606, receive a set of report parameters for the mutual information from the network entity (base station 604). The set of report parameters may include one or more of: the frequency domain resolution for the mutual information, the time domain resolution for the mutual information, the report periodicity for the transmission of the mutual information, or an indicator indicating the a-periodical transmission of the mutual information. In some aspects, 802 may be performed by the rank reduction component 198.

In some aspects, the precoding scheme may include one or more sets of combined precoders based on original precoders for each layer of the first number of layers over a set of frequency ranges. For example, referring to FIG. 6, the precoding scheme (at 620) may include one or more sets of combined precoders based on original precoders for each layer of the first number of layers over a set of frequency ranges. Referring to FIG. 4, a set of combined precoders may be obtained by alternating the precoder $P_0$ for layer 0 402 and the precoder $P_1$ for layer 1 404.

In some aspects, the precoding scheme may further include a second number of combined layers based on the mutual information for each layer of the first number of layers. The second number may be less than the first number, and the second number of combined layers may respectively correspond to the one or more sets of combined precoders. For example, referring to FIG. 4, the precoding scheme further includes a second number of combined layers (e.g., one combined layer 410) based on the mutual information for layer 0 402 and layer 1 404. The second number (e.g., 1) may be less than the first number (e.g., 2).

In some aspects, the channel information (at 812) may include the rank reduction information, and the rank reduction information may include a rank reduction matrix indicating a reduction in ranks from a first number to a second number. For example, referring to FIG. 6, the channel information (at 618) may include the rank reduction information. Referring to FIG. 5, the rank reduction information may include a rank reduction matrix $G_{L1*L2}$ 508 indicating a reduction in ranks from a first number $L_1$ to a second number $L_2$.

In some aspects, at 808, the UE may receive at least one DMRS; and determine, based on the at least one DMRS, the rank reduction matrix. For example, referring to FIG. 6, the UE 602 may receive, at 610, at least one DMRS, and, at 612, determine, based on the at least one DMRS, the rank reduction matrix. In some aspects, 808 may be performed by the rank reduction component 198.

In some aspects, at 804, the UE may receive, from the network entity, a rank reduction configuration for the rank reduction. The rank reduction matrix may be based on the rank reduction configuration. The rank reduction configuration may include one or more of: the second number after the rank reduction, one or more criteria for the rank reduction, the frequency domain resolution of a precoder, a first indication of a codebook comprising a set of available precoders, the restriction condition for the precoder, the report periodicity for the transmission of the rank reduction matrix, or a second indication of an a-periodical transmission of the rank reduction matrix. For example, referring to FIG. 6, the UE 602 may, at 608, receive, from the network entity (base station 604), a rank reduction configuration for the rank reduction. The rank reduction matrix may be based on the rank reduction configuration. The rank reduction configuration may include one or more of: the second number after the rank reduction, one or more criteria for the rank reduction, the frequency domain resolution of a precoder, a first indication of a codebook comprising a set of available precoders, the restriction condition for the precoder, the report periodicity for the transmission of the rank reduction matrix, or a second indication of an a-periodical transmission of the rank reduction matrix. In some aspects, 804 may be performed by the rank reduction component 198.

In some aspects, the restriction condition includes a maximum power per antenna. For example, referring to FIG. 6, the restriction condition (which may be included in the rank reduction configuration in 608) may include the maximum power per antenna.

In some aspects, the one or more criteria for the rank reduction may include one or more of: the capacity of the channel, or the SNR of the channel. For example, referring to FIG. 6, the one or more criteria for the rank reduction (which may be included in the rank reduction configuration in 608) may include one or more of: the capacity of the channel, or the SNR of the channel.

In some aspects, the precoding scheme may include a precoding matrix. The precoding matrix may be based on a first matrix based on a channel state information-reference signal (CSI-RS) and the rank reduction matrix. For example, referring to FIG. 5, the precoding scheme may include a precoding matrix 502. The precoding matrix 502 may be based on a first matrix based on a channel state information-reference signal (CSI-RS) (e.g., a first precoding matrix $P_{T*L1}$ 506) and the rank reduction matrix 508.

Figure 9:
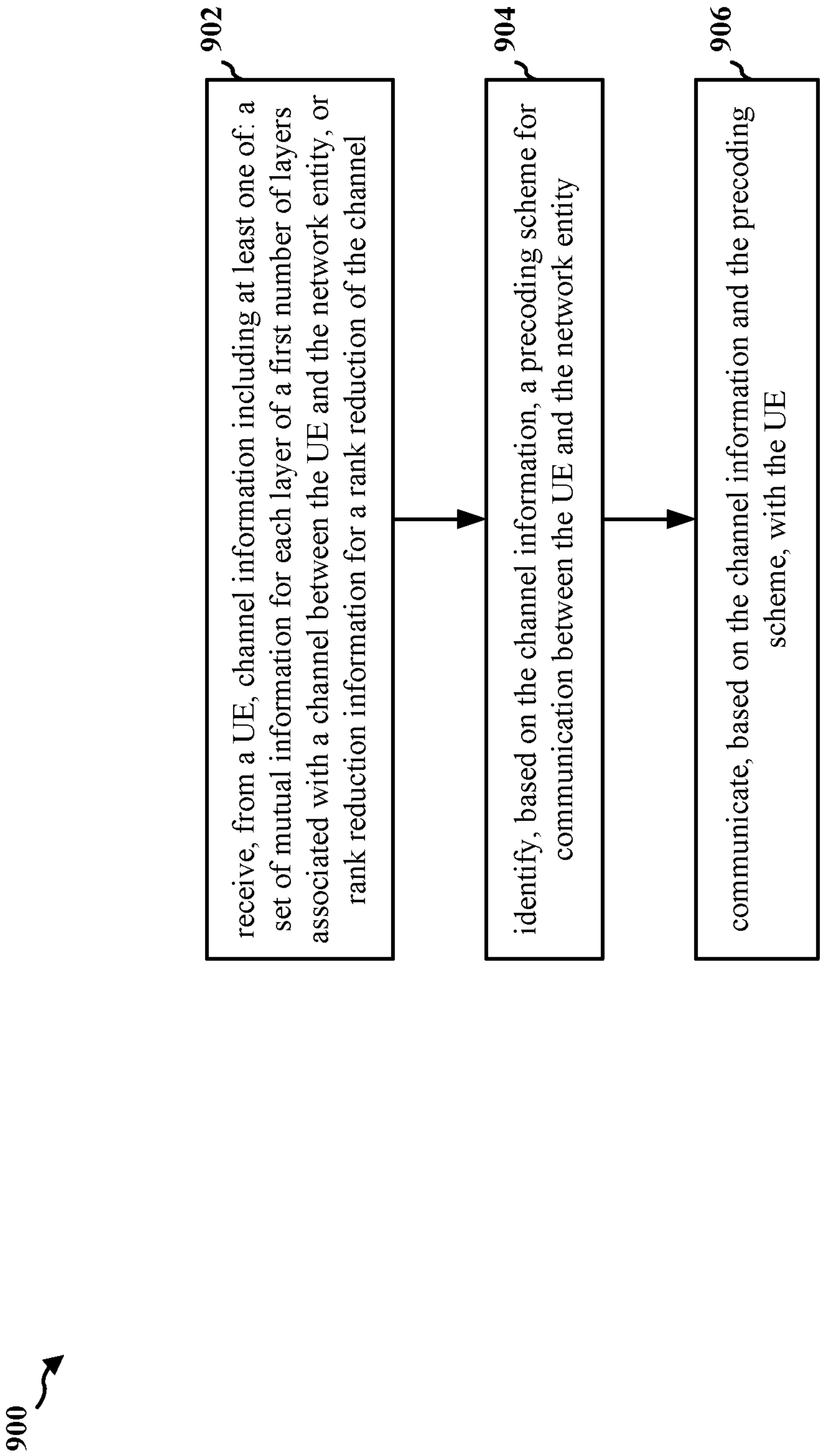
FIG. 9 is a flowchart illustrating methods of wireless communication at a network entity in accordance with various aspects of the present disclosure.

FIG. 9 is a flowchart 900 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604; or the network entity 1102 in the hardware implementation of FIG. 11). By providing channel information related to the channel condition, including measured mutual information per layer of a plurality of layers or the rank reduction matrix, to the network for the rank reduction, the methods allow the network to evaluate the reception quality on a per-layer basis, ensuring the best layer per frequency is selected and the most suitable precoding matrix is used under the current channel conditions, thereby enhancing the efficiency and quality of data transmission.

As shown in FIG. 9, at 902, the network entity may receive channel information from a UE. The channel information may include at least one of: a set of mutual information for each layer of a first number of layers associated with a channel between the UE and the network entity, or rank reduction information for a rank reduction of the channel. The UE may be the UE 104, 350, 602, or the apparatus 1104 in the hardware implementation of FIG. 11. FIG. 4, FIG. 5, and FIG. 6 illustrate various aspects of the steps in connection with flowchart 900. For example, referring to FIG. 6, the network entity (base station 604) may receive, at 618, channel information from a UE 602. The channel information may include at least one of: a set of mutual information for each layer of a first number of layers associated with a channel between the UE 602 and the network entity (base station 604), or rank reduction information for a rank reduction of the channel. In some aspects, 902 may be performed by the rank reduction component 199.

At 904, the network entity may identify, based on the channel information, a precoding scheme for communication between the UE and the network entity. For example, referring to FIG. 6, the network entity (base station 604) may, at 620, identify, based on the channel information, a precoding scheme for communication between the UE 602 and the network entity (base station 604). In some aspects, 904 may be performed by the rank reduction component 199.

At 906, the network entity may communicate with the UE based on the channel information and the precoding scheme. For example, referring to FIG. 6, the network entity (base station 604) may, at 622, communicate with the UE 602 based on the channel information (at 618) and the precoding scheme (at 620). In some aspects, 906 may be performed by the rank reduction component 199.

Figure 10:
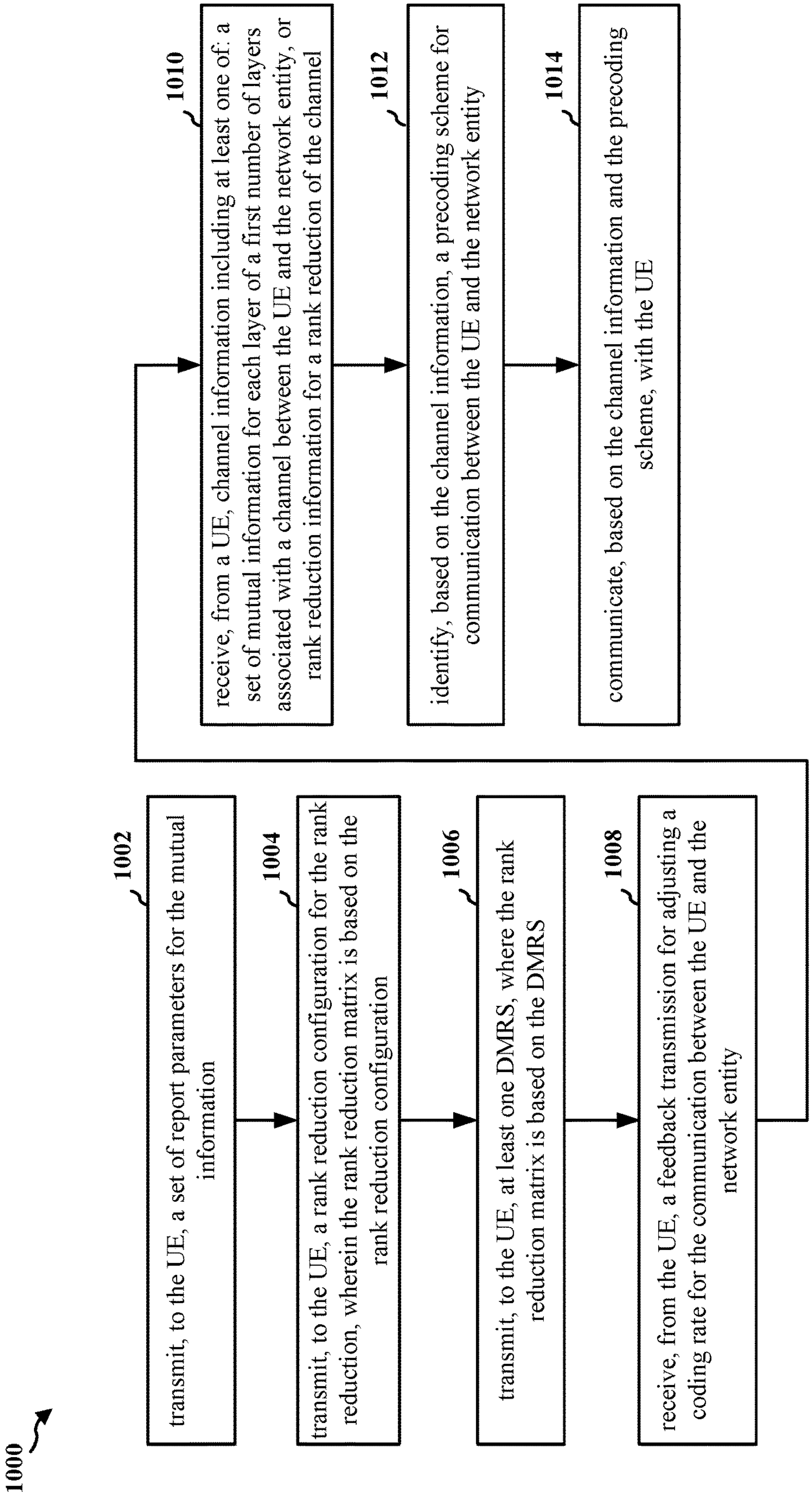
FIG. 10 is a flowchart illustrating methods of wireless communication at a network entity in accordance with various aspects of the present disclosure.

FIG. 10 is a flowchart 1000 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604; or the network entity 1102 in the hardware implementation of FIG. 11). By providing channel information related to the channel condition, including measured mutual information per layer of a plurality of layers or the rank reduction matrix, to the network for the rank reduction, the methods allow the network to evaluate the reception quality on a per-layer basis, ensuring the best layer per frequency is selected and the most suitable precoding matrix is used under the current channel conditions, thereby enhancing the efficiency and quality of data transmission.

As shown in FIG. 10, at 1010, the network entity may receive channel information from a UE. The channel information may include at least one of: a set of mutual information for each layer of a first number of layers associated with a channel between the UE and the network entity, or rank reduction information for a rank reduction of the channel. The UE may be the UE 104, 350, 602, or the apparatus 1104 in the hardware implementation of FIG. 11. FIG. 4, FIG. 5, and FIG. 6 illustrate various aspects of the steps in connection with flowchart 1000. For example, referring to FIG. 6, the network entity (base station 604) may receive, at 618, channel information from a UE 602. The channel information may include at least one of: a set of mutual information for each layer of a first number of layers associated with a channel between the UE 602 and the network entity (base station 604), or rank reduction information for a rank reduction of the channel. In some aspects, 1010 may be performed by the rank reduction component 199.

At 1012, the network entity may identify, based on the channel information, a precoding scheme for communication between the UE and the network entity. For example, referring to FIG. 6, the network entity (base station 604) may, at 620, identify, based on the channel information, a precoding scheme for communication between the UE 602 and the network entity (base station 604). In some aspects, 1012 may be performed by the rank reduction component 199.

At 1014, the network entity may communicate with the UE based on the channel information and the precoding scheme. For example, referring to FIG. 6, the network entity (base station 604) may, at 622, communicate with the UE 602 based on the channel information (at 618) and the precoding scheme (at 620). In some aspects, 1014 may be performed by the rank reduction component 199.

In some aspects, to receive the channel information (at 1010), the network entity may receive the channel information via one of: UCI, a MAC-CE, or an RRC message. For example, referring to FIG. 6, the network entity (base station 604) may, at 618, receive the channel information via one of: UCI, a MAC-CE, or an RRC message.

In some aspects, at 1008, the network entity may receive, from the UE, a feedback transmission for adjusting the coding rate for the communication between the UE and the network entity. The feedback transmission may be associated with the MIRS. To receive the channel information (at 1010), the network entity may receive the channel information via the feedback transmission. For example, referring to FIG. 6, the network entity (base station 604) may, at 616, receive, from the UE 602, a feedback transmission for adjusting the coding rate for the communication between the UE 602 and the network entity (base station 604). The feedback transmission may be associated with the MIRS. To receive the channel information (at 618), the network entity (base station 604) may receive the channel information via the feedback transmission (at 616). In some aspects, 1008 may be performed by the rank reduction component 199.

In some aspects, the channel information may include the set of mutual information for each layer of the first number of layers based on at least one of a time-domain granularity and a frequency-domain granularity. Each mutual information of the set of mutual information may be based on a set of LLR values associated with each layer of the first number of layers. For example, referring to FIG. 4, the channel information may include the set of mutual information for each layer of the first number of layers (e.g., two sets of mutual information for layer 0 402 and layer 1 404, respectively). The mutual information may be calculated based on a set of LLR values according to Equation (1).

In some aspects, at 1002, the network entity may transmit a set of report parameters for the mutual information to the UE. The set of report parameters may include one or more of: the frequency domain resolution for the mutual information, the time domain resolution for the mutual information, the report periodicity for the transmission of the mutual information, or an indicator of an a-periodical transmission of the mutual information. For example, referring to FIG. 6, the network entity (base station 604) may transmit, at 606, a set of report parameters for the mutual information to the UE 602. The set of report parameters may include one or more of: the frequency domain resolution for the mutual information, the time domain resolution for the mutual information, the report periodicity for the transmission of the mutual information, or an indicator of an a-periodical transmission of the mutual information. In some aspects, 1002 may be performed by the rank reduction component 199.

In some aspects, to identify the precoding scheme (at 1012), the network entity may identify one or more sets of combined precoders based on original precoders for each layer of the first number of layers over a set of frequency ranges. For example, the network entity (base station 604)

may identify, at 620, one or more sets of combined precoders based on original precoders for each layer of the first number of layers over a set of frequency ranges. Referring to FIG. 4, a set of combined precoders may be obtained by alternating the precoder $P_0$ for layer 0 402 and the precoder $P_1$ for layer 1 404.

In some aspects, to identify the precoding scheme (at 1012), the network entity may further identify a second number of combined layers based on the mutual information for each layer of the first number of layers. The second number may be less than the first number, and the second number of combined layers may respectively correspond to the one or more sets of combined precoders. For example, referring to FIG. 4, the network entity (base station 604) may identify a second number of combined layers (e.g., one combined layer 410) based on the mutual information for layer 0 402 and layer 1 404. The second number (e.g., 1) may be less than the first number (e.g., 2).

In some aspects, the channel information (at 1010) may include the rank reduction information. The rank reduction information may include a rank reduction matrix indicating a reduction in ranks from a first number to a second number. For example, referring to FIG. 6, the channel information (at 618) may include the rank reduction information. Referring to FIG. 5, the rank reduction information may include a rank reduction matrix $G_{L1*L2}$ 508 indicating a reduction in ranks from a first number $L_1$ to a second number $L_2$.

In some aspects, at 1006, the network entity may transmit at least one DMRS to the UE. The rank reduction matrix may be based on the DMRS. For example, referring to FIG. 6, the network entity (base station 604) may transmit, at 610, at least one DMRS to the UE 602. The rank reduction matrix may be based on the DMRS. In some aspects, 1006 may be performed by the rank reduction component 199.

In some aspects, at 1004, the network entity may transmit a rank reduction configuration for the rank reduction to the UE. The rank reduction matrix may be based on the rank reduction configuration, and the rank reduction configuration may include one or more of: the second number after the rank reduction, one or more criteria for the rank reduction, the frequency domain resolution of a precoder, a first indication of a codebook comprising a set of available precoders, the restriction condition for the precoder, the report periodicity for the transmission of the rank reduction matrix, or a second indication of an a-periodical transmission of the rank reduction matrix. For example, referring to FIG. 6, the network entity (base station 604) may, at 608, transmit a rank reduction configuration for the rank reduction to the UE 602. The rank reduction matrix may be based on the rank reduction configuration, and the rank reduction configuration may include one or more of: the second number after the rank reduction, one or more criteria for the rank reduction, the frequency domain resolution of a precoder, a first indication of a codebook comprising a set of available precoders, the restriction condition for the precoder, the report periodicity for the transmission of the rank reduction matrix, or a second indication of an a-periodical transmission of the rank reduction matrix. In some aspects, 1004 may be performed by the rank reduction component 199.

In some aspects, the restriction condition may include the maximum power per antenna. For example, referring to FIG. 6, the restriction condition (which may be included in the rank reduction configuration in 608) may include the maximum power per antenna.

In some aspects, the one or more criteria for the rank reduction may include one or more of: the capacity of the channel, or the SNR of the channel. For example, referring to FIG. 6, the one or more criteria for the rank reduction (which may be included in the rank reduction configuration in 608) may include one or more of: the capacity of the channel, or the SNR of the channel.

In some aspects, the precoding scheme may include a precoding matrix. The precoding matrix may be based on a first matrix based on a channel state information-reference signal (CSI-RS) and the rank reduction matrix. For example, referring to FIG. 5, the precoding scheme may include a precoding matrix 502. The precoding matrix 502 may be based on a first matrix based on a channel state information-reference signal (CSI-RS) (e.g., a first precoding matrix $P_{T*L1}$ 506) and the rank reduction matrix 508.

Figure 11:
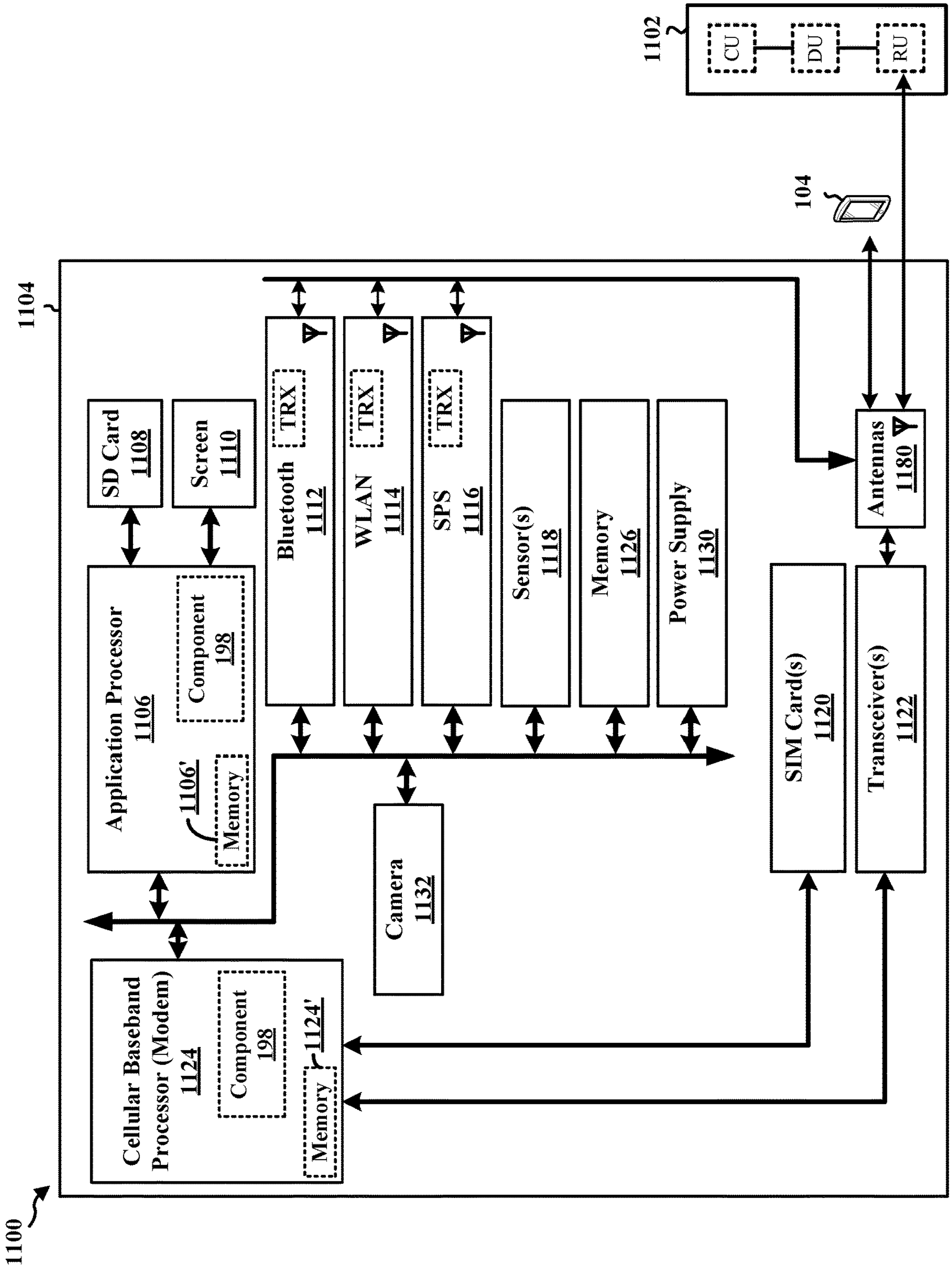
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor (or processing circuitry) 1124 (also referred to as a modem) coupled to one or more transceivers 1122 (e.g., cellular RF transceiver). The cellular baseband processor(s) (or processing circuitry) 1124 may include at least one on-chip memory (or memory circuitry) 1124'. In some aspects, the apparatus 1104 may further include one or more subscriber identity modules (SIM) cards 1120 and at least one application processor (or processing circuitry) 1106 coupled to a secure digital (SD) card 1108 and a screen 1110. The application processor(s) (or processing circuitry) 1106 may include on-chip memory (or memory circuitry) 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) (or processing circuitry) 1124 communicates through the transceiver(s) 1122 via one or more antennas 1180 with the UE 104 and/or with an RU associated with a network entity 1102. The cellular baseband processor(s) (or processing circuitry) 1124 and the application processor(s) (or processing circuitry) 1106 may each include a computer-readable medium/memory (or memory circuitry) 1124', 1106', respectively. The additional memory modules 1126 may also be considered a computer-readable medium/memory (or memory circuitry). Each computer-readable medium/memory (or memory circuitry) 1124', 1106', 1126 may be non-transitory. The cellular baseband processor(s) (or processing circuitry) 1124 and the application processor(s) (or processing circuitry) 1106 are each responsible for general processing, including the execution of software stored on the computer-readable medium/memory (or memory circuitry). The software, when executed by the cellular baseband processor(s) (or processing circuitry) 1124/application processor(s) (or processing circuitry) 1106, causes the cellular baseband processor(s) (or processing circuitry) 1124/application processor(s) (or processing circuitry) 1106 to perform the various functions described supra. The cellular baseband processor(s) (or processing circuitry) 1124 and the application processor(s) (or processing circuitry) 1106 are configured to perform the various functions described supra based at least in part of the information stored in the memory (or memory circuitry). That is, the cellular baseband processor(s) (or processing circuitry) 1124 and the application processor(s) (or processing circuitry) 1106 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1124/application processor(s) (or processing circuitry) 1106 when executing software. The cellular baseband processor (s) (or processing circuitry) 1124/application processor(s) (or processing circuitry) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) (or processing circuitry) 1124 and/or the application processor(s) (or processing circuitry) 1106, and in another configuration, the apparatus 1104 may be the entire UE (e.g., see UE 350 of FIG. 3) and include the additional modules of the apparatus 1104.

As discussed supra, the component 198 may be configured to obtain channel information including at least one of: a set of mutual information for each layer of a first number of layers associated with a channel between the UE and a network entity, or rank reduction information for a rank reduction of the channel; transmit, to the network entity, the channel information for an identification of a precoding scheme for communication between the UE and the network entity; and communicate, based on the channel information and the precoding scheme, with the network entity. The component 198 may be further configured to perform any of the aspects described in connection with the flowcharts in FIG. 7 and FIG. 8, and/or performed by the UE 602 in FIG. 6. The component 198 may be within the cellular baseband processor(s) (or processing circuitry) 1124, the application processor(s) (or processing circuitry) 1106, or both the cellular baseband processor(s) (or processing circuitry) 1124 and the application processor(s) (or processing circuitry) 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) (or processing circuitry) 1124 and/or the application processor (s) (or processing circuitry) 1106, includes means for obtaining channel information including at least one of: a set of mutual information for each layer of a first number of layers associated with a channel between the UE and a network entity, or rank reduction information for a rank reduction of the channel, means for transmitting, to the network entity, the channel information for an identification of a precoding scheme for communication between the UE and the network entity, and means for communicating, based on the channel information and the precoding scheme, with the network entity. The apparatus 1104 may further include means for performing any of the aspects described in connection with the flowcharts in FIG. 7 and FIG. 8, and/or aspects performed by the UE 602 in FIG. 6. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
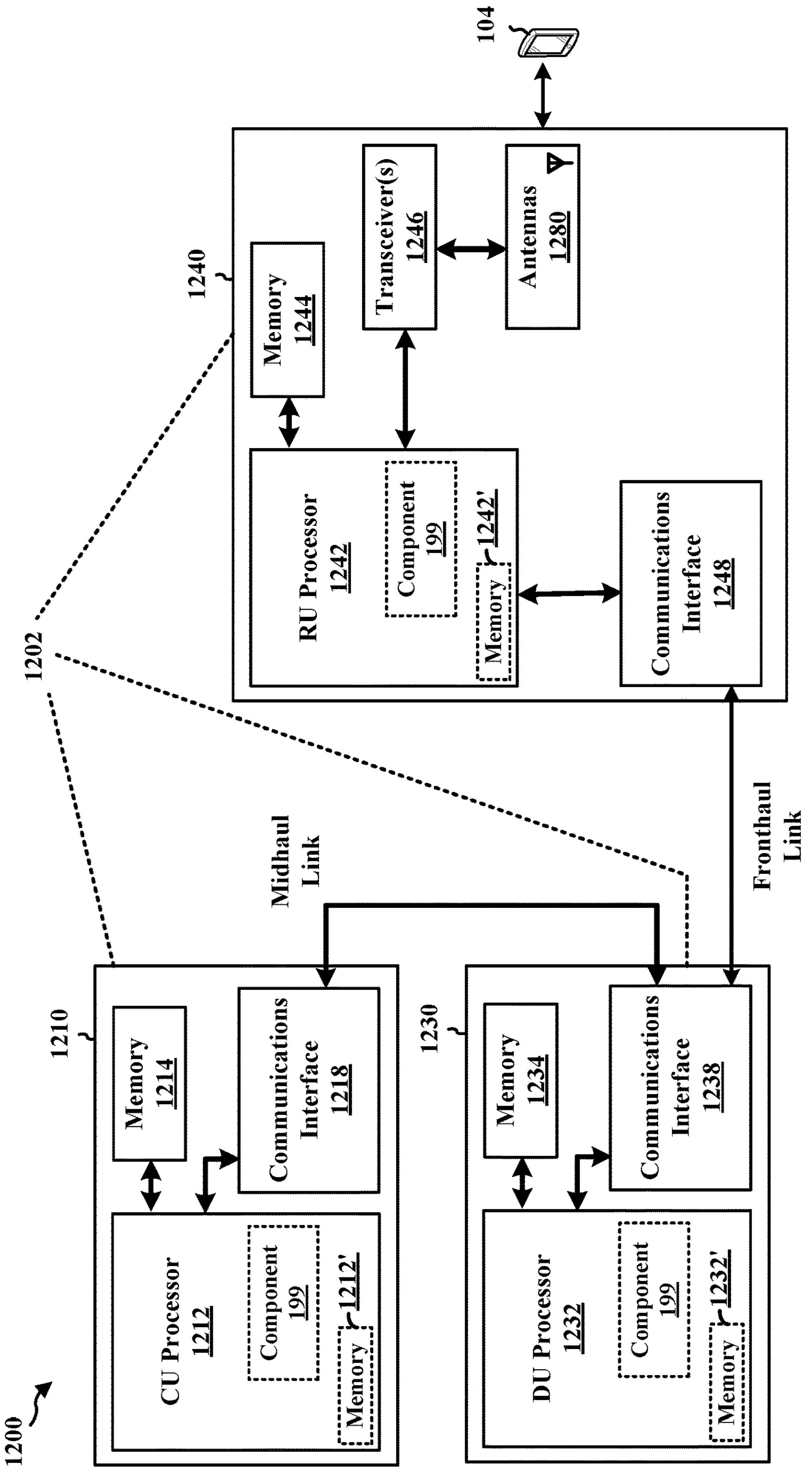
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor (or processing circuitry) 1212. The CU processor(s) (or processing circuitry) 1212 may include on-chip memory (or memory circuitry) 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor (or processing circuitry) 1232. The DU processor (s) (or processing circuitry) 1232 may include on-chip memory (or memory circuitry) 1232'. In some aspects, the DU 1230 may further include additional memory modules 1234 and a communications interface 1238. The DU 1230 communicates with the RU 1240 through a fronthaul link. The RU 1240 may include at least one RU processor (or processing circuitry) 1242. The RU processor(s) (or processing circuitry) 1242 may include on-chip memory (or memory circuitry) 1242'. In some aspects, the RU 1240 may further include additional memory modules 1244, one or more transceivers 1246, antennas 1280, and a communications interface 1248. The RU 1240 communicates with the UE 104. The on-chip memory (or memory circuitry) 1212', 1232', 1242' and the additional memory modules 1214, 1234, 1244 may each be considered a computer-readable medium/memory (or memory circuitry). Each computer-readable medium/memory (or memory circuitry) may be non-transitory. Each of the processors (or processing circuitry) 1212, 1232, 1242 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to receive, from a UE, channel information comprising at least one of: a set of mutual information for each layer of a first number of layers associated with a channel between the UE and the network entity, or rank reduction information for a rank reduction of the channel; identify, based on the channel information, a precoding scheme for communication between the UE and the network entity; and communicate, based on the channel information and the precoding scheme, with the UE. The component 199 may be further configured to perform any of the aspects described in connection with the flowcharts in FIG. 9 and FIG. 10, and/or performed by the base station 604 in FIG. 6. The component 199 may be within one or more processors (or processing circuitry) of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 includes means for receiving, from a UE, channel information comprising at least one of: a set of mutual information for each layer of a first number of layers associated with a channel between the UE and the network entity, or rank reduction information for a rank reduction of the channel, means for identifying, based on the channel information, a precoding scheme for communication between the UE and the network entity, and means for communicating, based on the channel information and the precoding scheme, with the UE. The network entity 1202 may further include means for performing any of the aspects described in connection with the flowcharts in FIG. 9 and FIG. 10, and/or aspects performed by the base station 604 in FIG. 6. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include obtaining channel information including at least one of: a set of mutual information for each layer of a first number of layers associated with a channel between the UE and a network entity, or rank reduction information for a rank reduction of the channel; transmitting, to the network entity, the channel information for an identification of a precoding scheme for communication between the UE and the network entity; and communicating, based on the channel information and the precoding scheme, with the network entity. By providing channel information related to the channel condition, including measured mutual information per layer of a plurality of layers or the rank reduction matrix, to the network for the rank reduction, the methods allow the network to evaluate the reception quality on a per-layer basis, ensuring the best layer per frequency is selected and the most suitable precoding matrix is used under the current channel conditions, thereby enhancing the efficiency and quality of data transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device,"

and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes obtaining channel information comprising at least one of: a set of mutual information for each layer of a first number of layers associated with a channel between the UE and a network entity, or rank reduction information for a rank reduction of the channel; transmitting, to the network entity, the channel information for an identification of a precoding scheme for communication between the UE and the network entity; and communicating, based on the channel information and the precoding scheme, with the network entity.

Aspect 2 is the method of aspect 1, wherein transmitting the channel information comprises: transmitting the channel information via one of: uplink control information (UCI), a medium access control (MAC)-control element (MAC-CE), or a radio resource control (RRC) message.

Aspect 3 is the method of any of aspects 1 to 2, where the method further includes providing, for the network entity, a feedback transmission for adjusting a coding rate for the communication between the UE and the network entity, wherein the feedback transmission is associated with a multiple incremental redundancy scheme (MIRS), and wherein transmitting the channel information comprises: transmitting, via the feedback transmission, the channel information.

Aspect 4 is the method of any of aspects 1 to 3, wherein the channel information includes the set of mutual information for each layer of the first number of layers based on at least one of a time-domain granularity or a frequency-domain granularity, and wherein each mutual information of the set of mutual information is based on a set of log-likelihood ratio (LLR) values associated with each layer of the first number of layers.

Aspect 5 is the method of aspect 4, wherein the set of mutual information for each layer of the first number of layers is based on an average of the mutual information corresponding to the LLR values related to a desired set of frequencies or a desired set of orthogonal frequency division multiplexing (OFDM) symbols.

Aspect 6 is the method of aspect 5, wherein the set of mutual information is based on a look-up table (LUT) comprising the LLRs values and corresponding mutual information.

Aspect 7 is the method of aspect 4, where the method further includes receiving, from the network entity, a set of report parameters for the mutual information, wherein the set of report parameters comprises one or more of: the frequency domain resolution for the mutual information, the time domain resolution for the mutual information, the report periodicity for the transmission of the mutual information, or an indicator of an a-periodical transmission of the mutual information.

Aspect 8 is the method of aspect 4, wherein the precoding scheme comprises: one or more sets of combined precoders based on original precoders for each layer of the first number of layers over a set of frequency ranges.

Aspect 9 is the method of aspect 8, wherein the precoding scheme further comprises a second number of combined layers based on the mutual information for each layer of the first number of layers, wherein the second number is less than the first number, and the second number of combined layers respectively correspond to the one or more sets of combined precoders.

Aspect 10 is the method of aspect 1, wherein the channel information includes the rank reduction information, and wherein the rank reduction information includes a rank reduction matrix indicating a reduction in ranks from a first number to a second number.

Aspect 11 is the method of aspect 10, where the method further includes receiving at least one demodulation reference signal (DMRS); and determining, based on the at least one DMRS, the rank reduction matrix.

Aspect 12 is the method of aspect 10, where the method further includes receiving, from the network entity, a rank reduction configuration for the rank reduction, wherein the rank reduction matrix is based on the rank reduction configuration, and wherein the rank reduction configuration comprises one or more of: the second number after the rank reduction, one or more criteria for the rank reduction, the frequency domain resolution of a precoder, the first indication of a codebook comprising a set of available precoders, the restriction condition for the precoder, the report periodicity for the transmission of the rank reduction matrix, or a second indication of an a-periodical transmission of the rank reduction matrix.

Aspect 13 is the method of aspect 12, wherein the restriction condition includes the maximum power per antenna.

Aspect 14 is the method of aspect 12, wherein the one or more criteria for the rank reduction include one or more of: the capacity of the channel, or the signal-to-noise ratio (SNR) of the channel.

Aspect 15 is the method of any of aspects 10 to 14, wherein the precoding scheme includes a precoding matrix, wherein the precoding matrix is based on a first matrix based on a channel state information-reference signal (CSI-RS) and the rank reduction matrix.

Aspect 16 is an apparatus for wireless communication at a UE, comprising: a processing system that includes processor circuitry and memory circuitry that stores code and is coupled with the processor circuitry, the processing system configured to cause the UE to perform the method of one or more of aspects 1-15.

Aspect 17 is an apparatus for wireless communication at a UE, comprising: at least one memory; and at least one processor coupled to the at least one memory and, where the at least one processor, individually or in any combination, is configured to perform the method of any of aspects 1-15.

Aspect 18 is the apparatus for wireless communication at a UE, comprising means for performing each step in the method of any of aspects 1-15.

Aspect 19 is an apparatus of any of aspects 16-18, further comprising a transceiver configured to receive or to transmit in association with the method of any of aspects 1-15.

Aspect 20 is a computer-readable medium (e.g., a non-transitory computer-readable medium) storing computer executable code at a UE, the code when executed by at least one processor causes the at least one processor to, individually or in any combination, perform the method of any of aspects 1-15.

Aspect 21 is a method of wireless communication at a network entity. The method includes receiving, from a user equipment (UE), channel information comprising at least one of: a set of mutual information for each layer of a first number of layers associated with a channel between the UE and the network entity, or rank reduction information for a rank reduction of the channel; identifying, based on the channel information, a precoding scheme for communication between the UE and the network entity; and communicating, based on the channel information and the precoding scheme, with the UE.

Aspect 22 is the method of aspect 21, wherein receiving the channel information comprises: receiving the channel information via one of: uplink control information (UCI), a medium access control (MAC)-control element (MAC-CE), or a radio resource control (RRC) message.

Aspect 23 is the method of any of aspects 21 to 22, where the method further includes receiving, from the UE, a feedback transmission for adjusting a coding rate for the communication between the UE and the network entity, wherein the feedback transmission for adjusting the coding rate is associated with a multiple incremental redundancy scheme (MIRS), and wherein receiving the channel information comprises: receiving, via the feedback transmission, the channel information.

Aspect 24 is the method of any of aspects 21 to 23, wherein the channel information includes the set of mutual information for each layer of the first number of layers based on at least one of a time-domain granularity and a frequency-domain granularity, and wherein each mutual information of the set of mutual information is based on a set of log-likelihood ratio (LLR) values associated with each layer of the first number of layers.

Aspect 25 is the method of aspect 24, where the method further includes transmitting, to the UE, a set of report parameters for the mutual information, wherein the set of report parameters comprises one or more of: the frequency domain resolution for the mutual information, the time domain resolution for the mutual information, the report periodicity for the transmission of the mutual information, or an indicator of an a-periodical transmission of the mutual information.

Aspect 26 is the method of any of aspects 24 to 25, wherein identifying the precoding scheme comprises: identifying one or more sets of combined precoders based on original precoders for each layer of the first number of layers over a set of frequency ranges.

Aspect 27 is the method of aspect 26, wherein identifying the precoding scheme further comprises: identifying a second number of combined layers based on the mutual information for each layer of the first number of layers, wherein the second number is less than the first number, and the second number of combined layers respectively correspond to the one or more set of combined precoders.

Aspect 28 is the method of any of aspects 21 to 27, wherein the channel information includes the rank reduction information, and wherein the rank reduction information includes a rank reduction matrix indicating a reduction in ranks from a first number to a second number.

Aspect 29 is the method of aspect 28, where the method further includes transmitting, to the UE, at least one demodulation reference signal (DMRS), wherein the rank reduction matrix is based on the DMRS.

Aspect 30 is the method of any of aspects 28 to 29, where the method further includes transmitting, to the UE, a rank reduction configuration for the rank reduction, wherein the rank reduction matrix is based on the rank reduction configuration, and wherein the rank reduction configuration comprises one or more of: the second number after the rank reduction, one or more criteria for the rank reduction, the frequency domain resolution of a precoder, a first indication of a codebook comprising a set of available precoders, the restriction condition for the precoder, the report periodicity for the transmission of the rank reduction matrix, or a second indication of an a-periodical transmission of the rank reduction matrix.

Aspect 31 is the method of aspect 30, wherein the restriction condition includes the maximum power per antenna.

Aspect 32 is the method of aspect 30, wherein the one or more criteria for the rank reduction include one or more of: the capacity of the channel, or the signal-to-noise ratio (SNR) of the channel.

Aspect 33 is the method of any of aspects 28 to 32, wherein the precoding scheme includes a precoding matrix, wherein the precoding matrix is based on a first matrix based on a channel state information-reference signal (CSI-RS) and the rank reduction matrix.

Aspect 34 is an apparatus for wireless communication at a network entity, comprising: a processing system that includes processor circuitry and memory circuitry that stores code and is coupled with the processor circuitry, the processing system configured to cause the network entity to perform the method of one or more of aspects 21-33.

Aspect 35 is an apparatus for wireless communication at a network entity, comprising: at least one memory; and at least one processor coupled to the at least one memory and, where the at least one processor, individually or in any combination, is configured to perform the method of any of aspects 21-33.

Aspect 36 is the apparatus for wireless communication at a network entity, comprising means for performing each step in the method of any of aspects 21-33.

Aspect 37 is an apparatus of any of aspects 34-36, further comprising a transceiver configured to receive or to transmit in association with the method of any of aspects 21-33.

Aspect 38 is a computer-readable medium (e.g., a non-transitory computer-readable medium) storing computer executable code at a network entity, the code when executed by at least one processor causes the at least one processor to, individually or in any combination, perform the method of any of aspects 21-33.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

obtain channel information, wherein the channel information includes a set of mutual information for each layer of a first number of layers associated with a channel between the UE and a network entity, wherein the set of mutual information for each layer of the first number of layers is based on at least one of a time-domain granularity or a frequency-domain granularity, and wherein each mutual information of the set of mutual information is based on a set of log-likelihood ratio (LLR) values associated with each layer of the first number of layers, and the set of mutual information for each layer of the first number of layers is based on an average of the mutual information corresponding to the LLR values related to a desired set of frequencies or a desired set of orthogonal frequency division multiplexing (OFDM) symbols;

transmit, to the network entity, the channel information for an identification of a precoding scheme for communication between the UE and the network entity; and communicate, based on the channel information and the precoding scheme, with the network entity.

2. The apparatus of claim 1, further comprising a transceiver coupled to the at least one processor, wherein, to transmit the channel information, the at least one processor is configured to transmit the channel information via the transceiver, and wherein to transmit the channel information, the at least one processor is configured to:

transmit the channel information via one of:

uplink control information (UCI), a medium access control (MAC)-control element (MAC-CE), or a radio resource control (RRC) message.

3. The apparatus of claim 1, wherein the at least one processor is further configured to:

provide, for the network entity, a feedback transmission for adjusting a coding rate for the communication between the UE and the network entity, wherein the feedback transmission is associated with a multiple incremental redundancy scheme (MIRS), and wherein to transmit the channel information, the at least one processor is configured to:

transmit, via the feedback transmission, the channel information.

4. The apparatus of claim 1, wherein the set of mutual information is based on a look-up table (LUT) comprising the LLR values and corresponding mutual information.

5. The apparatus of claim 1, wherein the at least one processor is further configured to:

receive, from the network entity, a set of report parameters for the mutual information, wherein the set of report parameters comprises one or more of:

a frequency domain resolution for the mutual information, a time domain resolution for the mutual information, a report periodicity for a transmission of the mutual information, or an indicator of an a-periodical transmission of the mutual information.

6. The apparatus of claim 1, wherein the precoding scheme comprises:

one or more sets of combined precoders based on original precoders for each layer of the first number of layers over a set of frequency ranges.

7. The apparatus of claim 6, wherein the precoding scheme further comprises:

a second number of combined layers based on the mutual information for each layer of the first number of layers, wherein the second number is less than the first number, and the second number of combined layers respectively correspond to the one or more sets of combined precoders.

8. An apparatus for wireless communication at a user equipment (UE), comprising:

at least one memory; and at least one processor coupled to the at least one memory and, based at least in part on information stored in the at least one memory, the at least one processor is configured to:

obtain channel information, wherein the channel information includes rank reduction information for a rank reduction of a channel between the UE and a network entity, and wherein the rank reduction information includes a rank reduction matrix indicating a reduction in ranks from a first number to a second number;

transmit, to the network entity, the channel information for an identification of a precoding scheme for communication between the UE and the network entity; and communicate, based on the channel information and the precoding scheme, with the network entity.

9. The apparatus of claim 8, wherein the at least one processor is further configured to:

receive at least one demodulation reference signal (DMRS); and determine, based on the at least one DMRS, the rank reduction matrix.

10. The apparatus of claim 8, wherein the at least one processor is configured to:

receive, from the network entity, a rank reduction configuration for the rank reduction, wherein the rank reduction matrix is based on the rank reduction configuration, and wherein the rank reduction configuration comprises one or more of:

the second number after the rank reduction, one or more criteria for the rank reduction, a frequency domain resolution of a precoder, a first indication of a codebook comprising a set of available precoders, a restriction condition for the precoder, a report periodicity for a transmission of the rank reduction matrix, or a second indication of an a-periodical transmission of the rank reduction matrix.

11. The apparatus of claim 10, wherein the restriction condition includes a maximum power per antenna.

12. The apparatus of claim 10, wherein the one or more criteria for the rank reduction include one or more of:

a capacity of the channel, or a signal-to-noise ratio (SNR) of the channel.

13. The apparatus of claim 8, wherein the precoding scheme includes a precoding matrix, wherein the precoding matrix is based on a first matrix based on a channel state information-reference signal (CSI-RS) and the rank reduction matrix.

14. The apparatus of claim 8, wherein to transmit the channel information, the at least one processor is configured to:

transmit the channel information via one of:

uplink control information (UCI), a medium access control (MAC)-control element (MAC-CE), or a radio resource control (RRC) message.

15. The apparatus of claim 8, wherein the at least one processor is further configured to:

provide, for the network entity, a feedback transmission for adjusting a coding rate for the communication between the UE and the network entity, wherein the feedback transmission is associated with a multiple incremental redundancy scheme (MIRS), and wherein to transmit the channel information, the at least one processor is configured to:

transmit, via the feedback transmission, the channel information.

16. An apparatus of wireless communication at a network entity, comprising:

at least one memory; and at least one processor coupled to the at least one memory and, based at least in part on information stored in the at least one memory, the at least one processor is configured to:

receive, from a user equipment (UE), channel information, wherein the channel information includes a set of mutual information for each layer of a first number of layers associated with a channel between the UE and the network entity, wherein the set of mutual information for each layer of the first number of layers is based on at least one of a time-domain granularity or a frequency-domain granularity, and wherein each mutual information of the set of mutual information is based on a set of log-likelihood ratio (LLR) values associated with each layer of the first number of layers;

identify, based on the channel information, a precoding scheme for communication between the UE and the network entity, wherein to identify the precoding scheme, the at least one processor is configured to:

identify one or more sets of combined precoders based on original precoders for each layer of the first number of layers over a set of frequency ranges; and communicate, based on the channel information and the precoding scheme, with the UE.

17. The apparatus of claim 16, further comprising a transceiver coupled to the at least one processor, wherein, to receive the channel information, the at least one processor is configured to receive the channel information via the transceiver, wherein to receive the channel information, the at least one processor is configured to:

receive the channel information via one of:

uplink control information (UCI), a medium access control (MAC)-control element (MAC-CE), or a radio resource control (RRC) message.

18. The apparatus of claim 17, wherein the at least one processor is further configured to:

receive, from the UE, a feedback transmission for adjusting a coding rate for the communication between the UE and the network entity, wherein the feedback transmission is associated with a multiple incremental redundancy scheme (MIRS), and wherein to receive the channel information, the at least one processor is configured to:

receive, via the feedback transmission, the channel information.

19. The apparatus of claim 16, wherein the at least one processor is further configured to:

transmit, to the UE, a set of report parameters for the mutual information, wherein the set of report parameters comprises one or more of:

a frequency domain resolution for the mutual information, a time domain resolution for the mutual information, a report periodicity for a transmission of the mutual information, or an indicator of an a-periodical transmission of the mutual information.

20. The apparatus of claim 16, wherein to identify the precoding scheme, the at least one processor is further configured to:

identify a second number of combined layers based on the mutual information for each layer of the first number of layers, wherein the second number is less than the first number, and the second number of combined layers respectively correspond to the one or more sets of combined precoders.

21. An apparatus of wireless communication at a network entity, comprising:

at least one memory; and at least one processor coupled to the at least one memory and, based at least in part on information stored in the at least one memory, the at least one processor is configured to:

receive, from a user equipment (UE), channel information, wherein the channel information includes rank reduction information for a rank reduction of a channel between the UE and the network entity, and wherein the rank reduction information includes a rank reduction matrix indicating a reduction in ranks from a first number to a second number;

identify, based on the channel information, a precoding scheme for communication between the UE and the network entity; and communicate, based on the channel information and the precoding scheme, with the UE.

22. The apparatus of claim 21, wherein the at least one processor is configured to:

transmit, to the UE, at least one demodulation reference signal (DMRS), wherein the rank reduction matrix is based on the DMRS.

23. The apparatus of claim 21, wherein the precoding scheme includes a precoding matrix, wherein the precoding matrix is based on a first matrix based on a channel state information-reference signal (CSI-RS) and the rank reduction matrix.

24. The apparatus of claim 21, wherein to receive the channel information, the at least one processor is configured to:

receive the channel information via one of:

uplink control information (UCI), a medium access control (MAC)-control element (MAC-CE), or a radio resource control (RRC) message.

25. The apparatus of claim 24, wherein the at least one processor is further configured to:

receive, from the UE, a feedback transmission for adjusting a coding rate for the communication between the UE and the network entity, wherein the feedback transmission is associated with a multiple incremental redundancy scheme (MIRS), and wherein to receive the channel information, the at least one processor is configured to:

receive, via the feedback transmission, the channel information.

26. The apparatus of claim 21, wherein the at least one processor is configured to:

transmit, to the UE, a rank reduction configuration for the rank reduction, wherein the rank reduction matrix is based on the rank reduction configuration, and wherein the rank reduction configuration comprises one or more of:

the second number after the rank reduction, one or more criteria for the rank reduction, a frequency domain resolution of a precoder, a first indication of a codebook comprising a set of available precoders, a restriction condition for the precoder, a report periodicity for a transmission of the rank reduction matrix, or a second indication of an a-periodical transmission of the rank reduction matrix.

27. The apparatus of claim 26, wherein the restriction condition includes a maximum power per antenna.

28. The apparatus of claim 26, wherein the one or more criteria for the rank reduction include one or more of:

a capacity of the channel, or a signal-to-noise ratio (SNR) of the channel.

* * * * *